(12) United States Patent
Comsa et al.

(10) Patent No.: US 9,301,225 B2
(45) Date of Patent: Mar. 29, 2016

(54) MANAGING POWER CONSUMPTION IN BASE STATIONS AND REMOTE ACCESS POINTS

(75) Inventors: Virgil Comsa, Montreal (CA); Diana Pani, Montreal (CA); Joseph S. Levy, Merrick, NY (US); Sylvie Gomes, Douglaston, NY (US); Benoit Pelletier, Roxboro (CA); Lujing Cai, Morganville, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 783 days.

(21) Appl. No.: 12/986,677

(22) Filed: Jan. 7, 2011

(65) Prior Publication Data

US 2012/0015657 A1     Jan. 19, 2012

Related U.S. Application Data

(60) Provisional application No. 61/293,432, filed on Jan. 8, 2010, provisional application No. 61/304,236, filed on Feb. 12, 2010, provisional application No. 61/304,027, filed on Feb. 12, 2010, provisional application No. 61/355,687, filed on Jun. 17, 2010.

(51) Int. Cl.
*H04W 36/00* (2009.01)
*H04W 52/02* (2009.01)
*H04W 48/16* (2009.01)

(52) U.S. Cl.
CPC ...... *H04W 36/0094* (2013.01); *H04W 52/0206* (2013.01); *H04W 36/0088* (2013.01); *H04W 48/16* (2013.01); *Y02B 60/50* (2013.01)

(58) Field of Classification Search
CPC ..... H04W 36/00; H04W 36/24; H04W 36/30; H04W 36/38; H04W 52/02

USPC .......... 455/436–444, 436–44, 574
See application file for complete search history.

(56) References Cited

U.S. PATENT DOCUMENTS 8,224,329 B2 * 7/2012 Van Lieshout et al. ....... 455/436
2002/0004371 A1 * 1/2002 Montgolfier .................. 455/70
(Continued)

FOREIGN PATENT DOCUMENTS

CN   101534518 A   9/2009
JP   200646537 A   9/2006
(Continued)

OTHER PUBLICATIONS

R3-080658—Dynamic Set of HNBs for Energy Savings and Interference Reduction (Apr. 3, 2008).*
(Continued)

*Primary Examiner* — Marisol Figueroa
(74) *Attorney, Agent, or Firm* — Condo Roccia Koptiw LLP

(57) ABSTRACT

A wireless transmit/receive unit (WTRU) in communication with a wireless network that may include a base station (or base node) and a cell that may be in a dormant mode is contemplated. The WTRU may determine that the WTRU may be within a vicinity of the cell and may generate a report that includes one or more measurements related to a location of the WTRU. The WTRU may transmit the report to the network and may receive an indication to perform one or more measurements related to the cell. The one or more measurements related to the cell may be based on a Common Pilot Channel (CPICH), a Synchronization Channel (SCH), and/or a Broadcast Channel (Primary Common Control Physical Channel) (BCH P-CCPCH) that may be transmitted by the cell upon a command from a base node.

3 Claims, 11 Drawing Sheets

(56) References Cited

U.S. PATENT DOCUMENTS

| | | | |
|---|---|---|---|
| 2004/0242257 A1 | 12/2004 | Valkealahti et al. | |
| 2005/0260990 A1 | 11/2005 | Huang et al. | |
| 2007/0026871 A1 | 2/2007 | Wager et al. | |
| 2007/0058588 A1* | 3/2007 | Fashandi et al. | 370/331 |
| 2007/0066329 A1 | 3/2007 | Laroia et al. | |
| 2007/0232309 A1 | 10/2007 | Koszarsky et al. | |
| 2008/0207195 A1* | 8/2008 | Ranta et al. | 455/423 |
| 2009/0005029 A1* | 1/2009 | Wang et al. | 455/423 |
| 2009/0005031 A1 | 1/2009 | Van Lieshout et al. | |
| 2009/0124261 A1* | 5/2009 | Shimomura | 455/436 |
| 2009/0285143 A1 | 11/2009 | Kwun et al. | |
| 2010/0002614 A1 | 1/2010 | Subrahmanya | |
| 2010/0087208 A1* | 4/2010 | Lister | 455/456.5 |
| 2011/0003591 A1* | 1/2011 | Venkatachalam et al. | 455/434 |
| 2012/0009936 A1 | 1/2012 | Ishii et al. | |
| 2012/0028629 A1* | 2/2012 | Liu et al. | 455/422.1 |

FOREIGN PATENT DOCUMENTS

| | | |
|---|---|---|
| JP | 2009049485 A | 3/2009 |
| JP | 2009-532936 | 9/2009 |
| WO | WO 2009-058068 | 5/2009 |
| WO | WO 2009058068 A1 * | 5/2009 |
| WO | WO 2009157600 A1 | 12/2009 |

OTHER PUBLICATIONS $3^{rd}$ Generation Partnership Project (3GPP), R3-092786, "Energy Saving in UTRAN", Huawei, 3GPP TSG-RAN WG3, #66, Jeju, Korea, Nov. 9-13, 2009, 3 pages.

$3^{rd}$ Generation Partnership Project (3GPP), R3-093401, "Introduction of Dormant Mode", Ericsson, 3GPP TSG-RAN WG3, Meeting #66, Jeju Island, South Korea, Nov. 9-13, 2009, 19 pages.

3rd Generation Partnership Project (3GPP), RP-091431, "Proposed WI on Enhanced Cell DTX for LTE", Ericsson, ST-Ericsson, 3GPP TSG-RAN, #46, Sanya, P.R. China, Dec. 1-4, 2009, 5 pages.

3rd Generation Partnership Project (3GPP), RP-091439, "Solutions for Energy Saving Within UTRA Node B", 3GPP TSG-RAN, #46, Sanya, P.R. China, Dec. 1-4, 2009, 4 pages.

$3^{rd}$ Generation Partnership Project (3GPP), TR 36.805, V9.0.0, "$3^{rd}$ Generation Partnership Project; Technical Specification Group Radio Access Network; Study on Minimization of Drive-Tests in Next Generation Networks (Release 9)", Dec. 2009, 24 pages.

$3^{rd}$ Generation Partnership Project (3GPP), TS 25.214, V9.1.0, "$3^{rd}$ Generation Partnership Project; Technical Specification, Group Radio Access Network; Physical Layer Procedures (FDD) (Release 9)", Dec. 2009, 98 pages.

$3^{rd}$ Generation Partnership Project (3GPP), TS 25.304, V1.0.0, "$3^{rd}$ Generation Partnership Project; Technical Specification Group (TSG) RAN; Working Group 2 (WG2); UE Procedures in Idle Mode", Apr. 2004, 32 pages.

$3^{rd}$ Generation Partnership Project (3GPP), TS 25.331, V1.0.0, "$3^{rd}$ Generation Partnership Project; Technical Specification Group (TSG) RAN; Working Group 2 (WG2); Radio Resource Control (RRC) Protocol Specification", Apr. 2009, 74 pages.

3rd Generation Partnership Project (3GPP), R3-081949, "Dynamic Setup of HNBs for Energy Savings and Interference Reduction", Mitsubishi Electric, 3GPP TSG RAN WG3 Meeting #61, Jeju Island, Korea, Aug. 18-22, 2008, 7 pages.

Feng, Sujuan "Self-Organizing Networks (SON) in 3GPP Long Term Evolution", Nomor Research GmbH, www.nomor.de, May 20, 2008, 15 pages.

IP.com, "A method for interference control and power saving for home access point", The IP.com Journal, © Nokia Siemens Networks, Dec. 13, 2007, 1 page.

\* cited by examiner

MANAGING POWER CONSUMPTION IN BASE STATIONS AND REMOTE ACCESS POINTS

CROSS REFERENCE TO RELATED APPLICATIONS

This application claims the benefit of U.S. Provisional Application No. 61/293,432, filed Jan. 8, 2010, titled "ENERGY-SAVING MODES FOR A BASE STATION", U.S. Provisional Application No. 61/304,236, filed Feb. 12, 2010, titled "ENERGY-SAVING MODES FOR A BASE STATION", U.S. Provisional Application No. 61/304,027, filed Feb. 12, 2010, titled "METHOD AND APPARATUS FOR REDUCING POWER CONSUMPTION OF REMOTE ACCESS POINTS", and U.S. Provisional Application No. 61/355,687, filed Jun. 17, 2010, titled "METHOD AND APPARATUS FOR REDUCING POWER CONSUMPTION OF REMOTE ACCESS POINTS", the contents of all four applications being hereby incorporated by reference in their respective entirety, for all purposes.

BACKGROUND

Cellular technology has evolved over the past decade. For example, with the evolution of Third Generation Mobile Systems towards High-Speed Downlink Packet Access (HSDPA) in Release 5 and High-Speed Uplink Packet Access (HSUPA) in Release 6, higher data rates may be obtained. This has opened the door to new mobile devices that offer constant connectivity to the Internet, while continuing to offer good quality voice services. The desire to maintain connectivity to virtual communities and the Internet, in conjunction to the arrival of new devices capable of offering a satisfying user experience has increased the demand on the existing network infrastructures.

To satisfy this increasing demand, network operators have deployed new infrastructure and/or acquired additional spectrum. One strategy that is also being used to satisfy the increase in traffic is to deploy smaller cells, also referred to as femto or pico cells, in areas where the demand is higher. These femto cells are typically located under the umbrella of a larger macro cell and while they do not extend the coverage they increase the available throughput in buildings and other public areas such as subways stations, coffee shops, shopping malls and so on.

Femto cell NodeBs (i.e., NodeBs, eNB, base stations (or base nodes), access points, and the like) have the advantage of being low-cost and small when compared to typical macro cells NodeBs. However, they typically serve a smaller number of user equipment (UE) or wireless transmit/receive units (WTRUs) and are thus not very power-efficient compared to a macro cell NodeB.

The NodeBs in a typical wireless network (for macro or femto cells) may consume a large amount of energy. While a portion of the energy consumed is used to carry data information, a large portion of that energy is also used on overhead control channels. Also, cellular networks may include devices such as base stations and wireless transmit/receive devices (WTRU), for example, that may consume more power than necessary for the respective operations and functions that the devices may implement at any particular time or in particular periods of time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Embodiments contemplate that management of a base station's and a WTRU's operations and functions may assist in the conservation of energy (or power) for the respective base stations and also to preserve other network resources. In a period of low utilization, it is desirable from an operator perspective to be more energy efficient and reduce the power consumption of any cell site, macro or femto. Saving on energy at NodeB may be beneficial for the Universal Mobile Telecommunications System (UMTS) and Long Term Evolution (LTE).

Embodiments contemplate that, from an energy saving perspective, it may be desirable to reduce the power consumption of one or more NodeBs. Also contemplate are femto cells, which may serve only a handful of wireless transmit/receive units (WTRUs) at any particular time and may be idle for a long period of time. Embodiments contemplate determinations of when to put these cells in power-saving mode and when to bring them back to the normal state. Also contemplated are mechanisms that may be taken by the network (e.g., controlling radio network controller (CRNC)) to place cells into a power saving mode. Also contemplate are mechanisms for a WTRU to measure dormant cells.

Embodiments contemplate methods and apparatuses for reducing power consumption of remote access points. Methods for measuring cells in a dormant mode are also contemplated. Embodiments also contemplate methods for determining cell vicinity and methods for controlling a target cell for measurements in a low activity state.

Embodiments contemplate a base node (or base station) may be communication with a wireless network and the base node may be configured to determine one or more energy-saving modes and may place the base node into the determined one or more energy-saving modes. The base node may also be configured to provide an indication of an energy-saving mode status. The indication of the energy-saving mode status may include at least one of: setting one or more flags in a transmitted Master Information Block (MIB), changing a Common Pilot Channel scrambling code, sending a paging message, or sending a dedicated message. Embodiments contemplate that the determining the one or more energy-saving modes may include at least one of: determining an energy-saving mode schedule provided by a controlling radio network controller (CRNC) or determining a low amount of activity based on a low activity detection algorithm.

Embodiments contemplate that one or more base stations (or base nodes) may operate according to one or more energy-saving modes. The energy-saving modes may involve the use of less signalling than during normal operation, in order to save energy. According to an exemplary first energy-saving mode, the base station may broadcast, and in some embodiments may broadcast exclusively, a Master Information Block (MIB) message and System Information Block (SIB) messages that may include cell access information. According to an exemplary second energy-saving mode, the base station may broadcast, and in some embodiments may broadcast exclusively, an MIB message. According to an exemplary third energy-saving mode, the base station may broadcast, and in some embodiments may broadcast exclusively, on a Common Pilot Channel (CPICH). According to an exemplary fourth energy-saving mode, the base station may transmit, and in some embodiments may transmit exclusively, user-plane data and may not transmit on access-related downlink channels.

Embodiments contemplate a wireless transmit/receive unit (WTRU), may be in communication with a wireless network and that the WTRU may be configured, at least in part, to determine that the WTRU may be within a vicinity of a cell in a dormant mode. The WTRU may also be configured to generate a first report that may include one or more measurements related to a location of the WTRU. The WTRU may also be configured to transmit the first report to the network and to receive an indication that the WTRU is to perform one or more measurements related to the cell. The WTRU may perform the one or measurements related to the cell and generate a second report that may include results of the one or more measurements related to the cell and may transmit the second report to the network.

Embodiments contemplate a base node that may be in communication with a wireless network. The base node may be configured at least in part, to provide an indicator that a wireless transmit/receive unit (WTRU) may use to determine if the WTRU may be within a vicinity of a cell in a dormant mode. The base node may be configured to receive a first report that may include one or more measurements related to a location of the WTRU. The base node may also provide an indication to the cell based at least in part on the first report. The indication to the cell may direct the cell to exit the dormant mode. Embodiments contemplate that the indication to the cell may include a WAKE-UP Common Pilot Channel (CPICH) message. The WAKE-UP CPICH message may cause the cell to transmit at least one of the CPICH or a Broadcast Channel (Primary Common Control Physical Channel) (BCH P-CCPCH). The base node may be further configured to receive an indication that the cell may have exited the dormant mode and the base node may provide an indication to the WTRU to generate a second report that may include results of one or more measurements related to the cell. The based node may also be configured to determine a handover condition and to provide an indication to the cell based at least in part on the handover condition. Embodiments contemplate that the indication to the cell may cause the cell to enter an active mode. The WAKE-UP CPICH message may cause the cell to transmit the CPICH or a Broadcast Channel (Primary Common Control Physical Channel) (BCH P-CCPCH) for a limited period of time.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1A:
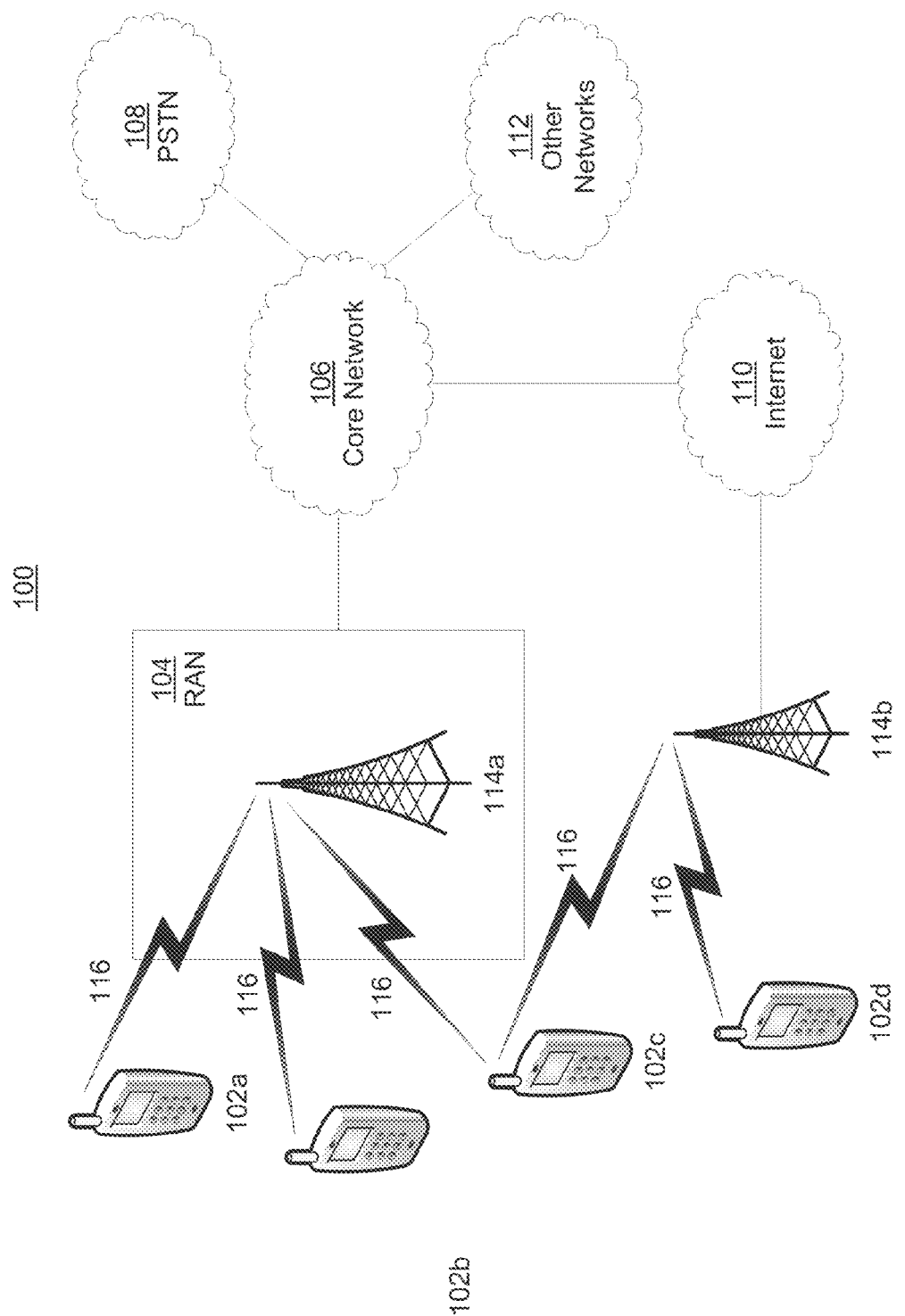
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
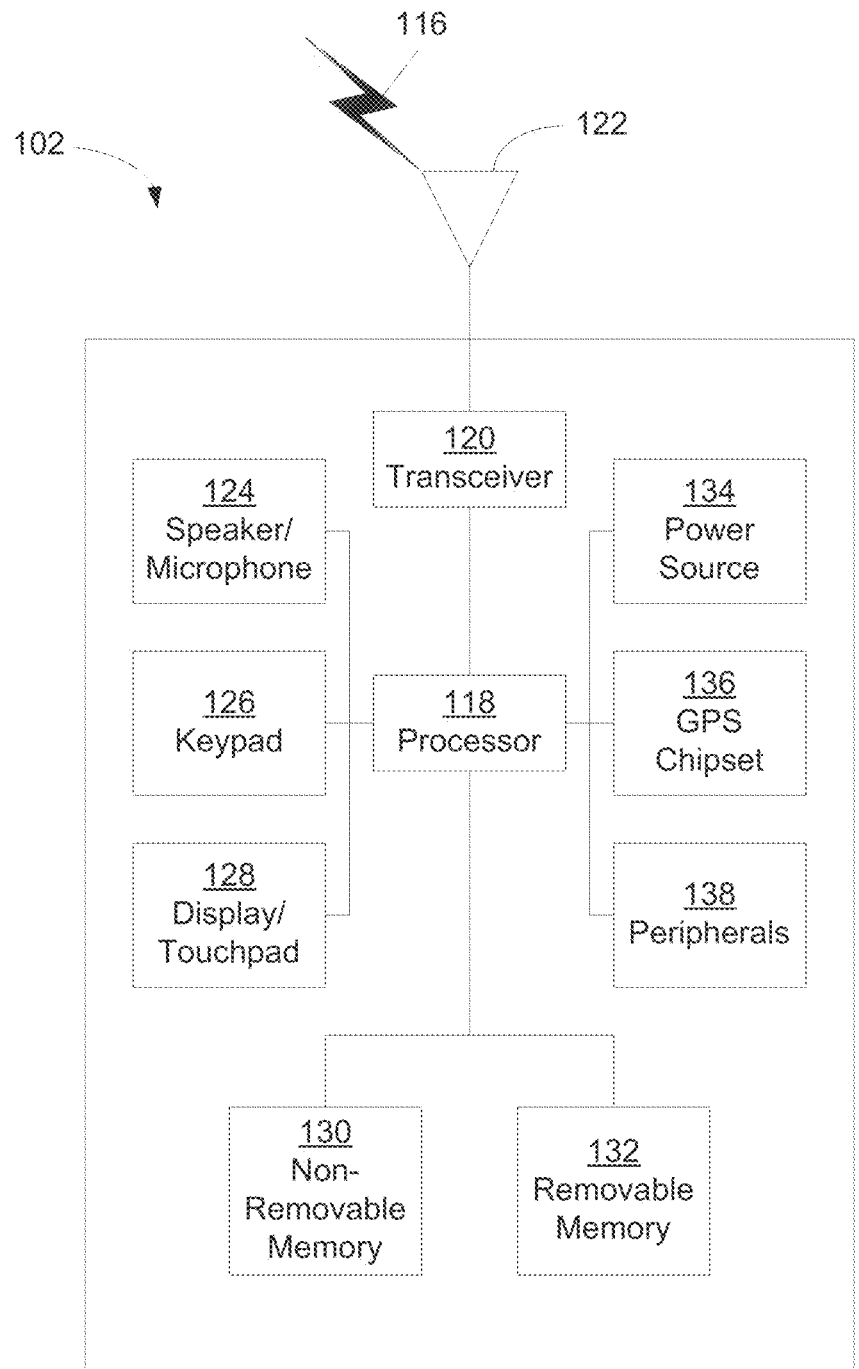
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 2:
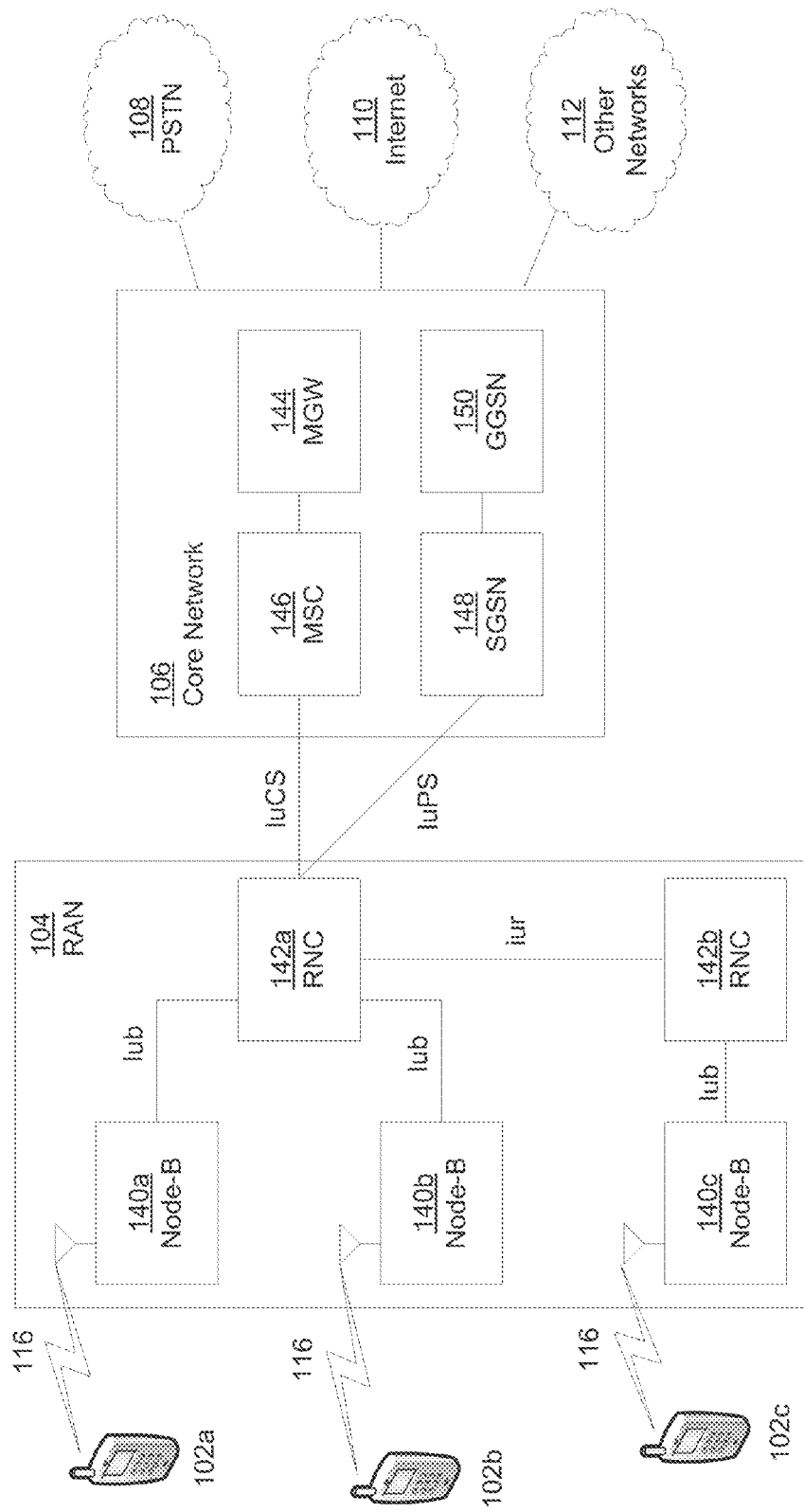
FIG. 2 is a system diagram of an example radio access network and an example core network that may be used within the communications system illustrated in FIG. 1A.

FIG. 2 is a system diagram of the RAN 104 and the core network 106 according to an embodiment. As noted above, the RAN 104 may employ a UTRA radio technology to communicate with the WTRUs 102*a*, 102*b*, and/or 102*c* over the air interface 116. The RAN 104 may also be in communication with the core network 106. As shown in FIG. 2, the RAN 104 may include Node-Bs 140*a*, 140*b*, 140*c*, which may each include one or more transceivers for communicating with the WTRUs 102*a*, 102*b*, and/or 102*c* over the air interface 116. The Node-Bs 140*a*, 140*b*, 140*c* may each be associated with a particular cell (not shown) within the RAN 104. The RAN 104 may also include RNCs 142*a*, 142*b*. It will be appreciated that the RAN 104 may include any number of Node-Bs and RNCs while remaining consistent with an embodiment.

As shown in FIG. 2, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macrodiversity, security functions, data encryption, and the like.

The core network 106 shown in FIG. 2 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 104 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 104 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the networks 112, which may include other wired or wireless networks that are owned and/or operated by other service providers.

When referred to herein, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. Also when referred to herein, the terminology "base station" includes but is not limited to a Node-B, a site controller, an access point (AP), or any other type of interfacing device capable of operating in a wireless environment. When referred to hereafter, the terminology "network" includes a Radio Network Controller (RNC), CRNC or Drift RNC as appropriate. Further, the terminology "RNC" may also include a CRNC or Drift RNC.

Examples are provided herein in terms of Universal Mobile Telecommunications System (UMTS)/UMTS Terrestrial Radio Access Network (UTRAN) systems. However, the concepts described herein are equally applicable to systems based on technologies such as: Evolved UMTS Terrestrial Radio Access Network (E-UTRAN); Long Term Evolution (LTE); LTE-Advanced; Institute of Electrical and Electronics Engineers (IEEE) Wireless Local Area Network (WLAN); IEEE Worldwide Interoperability for Microwave Access (WiMax); Wireless Broadband (WiBro); Global System for Mobile Communications (GSM); GSM Enhanced Data Rates For GSM Evolution (EDGE) Radio Access Network (GE-RAN); Code Division Multiple Access 2000 (CDMA2000); or any other wireless communications technology. Where a specific example of a UMTS/UTRAN concept is provided, it should be appreciated that an analogous concept in any wireless technology may be used, mutatis mutandis. Where specific UTRAN channels (such as a Broadcast Control Channel (BCCH)) are described, analogous channels may be used in different technologies. Where specific types of messages (such as, for example, specific System Information (SI) messages or Master Information Block (MIB) messages) are described, analogous messages may be used. For example, where a Node-B is described, a different type of base station (such as, for example, an eNodeB, a base transceiver station (BTS), a radio base station (RBS), an access point, or any other type of base station) may be used. As an additional example, wherever a Primary Scrambling Code (PSC) in a UTRAN is described, a Physical Cell Identifier (PCI) may be used in an E-UTRAN.

Although one or more examples are provided herein in terms of a WTRU in idle mode, the principles described below are equally applicable to other modes, such as but not limited to URA_PCH, CELL_PCH, and CELL_FACH states, for example.

Embodiments contemplate that when referred to herein, a base station may be referred to as being in "dormant mode" when its transmitter may be turned off and the base station may not be transmitting on any channels. Also, when referred to hereafter, a base station is referred to as being in an "energy-saving mode" or an "energy-saving state" when it may have reduced its energy requirements from normal operation but may not have fully turned off its transmitter. "Energy saving state" and "energy-saving mode" may be used interchangeably. A base station may be referred to as "entering" or "activating" an energy-saving mode. A base station that has the capability of operating in an energy-saving mode may be said to "support" an energy-saving mode. Also when referred to hereafter, a base station that "deactivates" an energy-saving state or energy-saving mode can be considered to move from an energy-saving state to a normal operating state.

Embodiments also contemplate that a "legacy" WTRU may be, for example, a WTRU that may not support features that are specific to a base station energy-saving mode. A legacy WTRU may communicate with a base station while the base station may be in an energy-saving mode and/or while the base station may be operating according to normal operation. A legacy WTRU may not, however, support energy-saving mode-specific features.

Embodiments contemplate that in UTRAN, for example, the following System Information Block (SIB) messages may contain at least the following information:

SIB1: which may contain information related to timer and constants and contains a domain-specific discontinuous reception (DRX) cycle length coefficient;

SIB3: which may contain information related to cell reselection, cell selection rules, cell identity, and access restrictions;

SIB4: which may contains information related to cell identity and access restrictions, in some circumstances, a WTRU may receive a SIB 4 message while in connected mode (e.g., not in idle mode), if the SIB 4 message is broadcasted by a Node-B;

SIB5 and SIB5bis: which contain information related to access rules, DRX cycles, and paging information; and SIB6: which may contain information related to the Physical Random Access Channel (PRACH) and the Secondary Common Control Physical Channel (S-CCPCH), in some circumstances, a WTRU may receive SIB 6 messages while in connected mode (e.g., not in idle mode), if the SIB 6 message is broadcasted by a Node-B.

Embodiments contemplate that a Radio Network Controller (RNC) may send a cell configuration message to a NodeB. The cell configuration message may include one or more information elements (IEs) that indicate that the NodeB may, and in some embodiments should, enter one or more energy-saving modes. The cell configuration message may additionally include related system information parameters. The related system information parameters may be included in the same IEs which indicate that the NodeB may or should enter an energy-saving mode, or may be included in one or more different IEs. Alternatively, a cell configuration message may include a flag indicating that the NodeB may or should enter the energy-saving mode. Upon receiving a cell configuration message from the RNC, the NodeB may activate an energy-saving mode according to one or more of the received parameters. For example, a controlling RNC may use the SYSTEM INFORMATION UPDATE REQUEST message to inform the NodeB about new MIB/SIB transmission requirements which may be implemented to achieve a specific energy saving mode.

Alternatively or additionally, the NodeB may store a definition of a configuration for the energy-saving mode. The definition may describe, for example, which SIB messages the NodeB may or may not transmit, and/or may be related to other system information parameters. The RNC may send a message to the NodeB containing an indicating information element. Upon receipt of the information element, the NodeB may activate the energy-saving mode according to the stored configuration for the energy-saving mode. Additionally, the NodeB may store multiple definitions of configurations, and the indicating information element may indicate which definition the NodeB should use.

Additionally, an RNC may configure network nodes related to the NodeB (for example, neighboring cells or drift RNCs (DRNCs)), to accommodate the energy-saving mode of the NodeB and to ensure proper operation of the network on the whole. This may include the RNC communicating with network nodes related to the NodeB. Network nodes that may be related to the NodeB include, for example, one or more of the nodes (such as other NodeBs) in geographical proximity to the NodeB. The RNC may store a list of related nodes. The RNC may send messages to the related network nodes to configure them appropriately. These messages may include one or more parameters that include but are not limited to: enhanced neighbor lists (a modified neighbor list adapted for energy saving network operation); neighbor lists that include indicators that the NodeB may be in an energy-saving mode; measurement control messages that that include indicators that the NodeB may be in an energy-saving mode (for example, a default Random Access Channel (RACH) or enhanced-RACH (E-RACH) configuration may be utilized for WTRU uplink measurement messages in one or more energy saving modes); access mode parameters; reselection rules that reflect that the NodeB may be in an energy-saving state; and a reduced set of MIBs and SIBs.

The related network nodes may be, for example, one or more of the nodes in the vicinity of the cell going to energy saving mode. The list of related network nodes may be determined by the network.

The controlling RNC may use a new cell configuration message, or one or a combination of existing cell configuration messages to reconfigure neighboring nodes. The cell configuration messages may include: SYSTEM INFORMATION UPDATE REQUEST, PHYSICAL SHARED CHANNEL RECONFIGURATION REQUEST, or COMMON TRANSPORT CHANNEL RECONFIGURATION REQUEST. The message may use existing modified IEs and/or newly defined IEs to convey the energy saving mode related cell parameters.

A NodeB may indicate that is has entered an energy-saving mode by sending one or more messages. It may do so by, for example, using one or more flags. The flags may be included, for example, in one or more MIB messages. Alternatively or additionally, a WTRU may detect whether a NodeB is in an energy-saving mode by detecting the SIB messages present or that the NodeB may be using and comparing the detected SIB messages to a list that may include the messages used in the energy-saving mode (e.g., this may be referred to as a blind detection).

Alternatively or additionally, an NodeB may enter energy saving mode autonomously based on a schedule supplied by the controlling RNC or operation and maintenance (OAM) system, or based on a low activity detection algorithm. Upon detection of a low activity or no activity state, the NodeB may use a RESOURCE STATUS INDICATION message to inform the controlling RNC that it is entering an energy saving mode. The NodeB may use, for example, the Resource Operational State IE and the Availability Status IE with an appropriate cause IE or a newly defined cause such as "entering energy saving mode."

Embodiments contemplate that upon reception of a RESOURCE STATUS INDICATION with the "entering energy saving mode" cause set to TRUE, the serving RNC may reconfigure the source NodeB with the appropriate energy savings-related parameters using the existing cell configuration messages. The controlling RNC may reconfigure the neighboring nodes to allow for full service coverage or appropriate mobility parameters, for example.

Alternatively or additionally, the NodeB may apply an energy saving mode default configuration and use the RESOURCE STATUS INDICATION with the "entering energy saving mode" cause set to TRUE message to inform the controlling RNC of entering an energy saving mode, and thus reducing the Iub interface signaling load. The Iub may be an interface between the RNC and the NodeB, for example.

The NodeB may signal that it has entered an energy-saving mode by sending one or more messages to one or more of the WTRUs that it is serving. The one or more messages may include, for example, a Paging Message. The Paging Message may be a Paging Type 1 message and may carry Multicast Control Channel (MCCH) modification information. Embodiments contemplate that for an MCCH, such as a Multimedia Broadcast Multicast Service (MBMS) point-to-multipoint control channel, the channel/service configuration may be changed in a NodeB while in an energy saving mode. The WTRU may need to be informed, via a message for example, that such a change has been or may be implemented. The one or more messages may also include a Paging Type 2 message that may include one or more fields describing a reason. The reason may be described as, for example, "MIB Change." The one or more messages may include a SYSTEM INFORMATION CHANGE INDICATION message. The SYSTEM INFORMATION CHANGE INDICATION message may include MCCH modification information. Alternatively or additionally, the one or more messages may include one or more dedicated messages. Upon receiving one or more messages indicating that the NodeB has entered the energy-saving mode, a WTRU may re-configure itself to operate according to the energy-saving mode. Additionally, one or more neighboring nodes that are reconfigured to support interoperability with the cell entering energy saving mode may use the embodiments described herein to inform WTRUs under the neighboring nodes' coverage that the network parameters have changed or may have changed. Alternatively, a legacy WTRU may reselect to another base station that is not operating in an energy-saving mode.

Embodiments contemplate instances where a legacy WTRU is in connected mode while a base station changes to an energy-saving mode, the base station may explicitly move the legacy WTRU to a different base station upon receiving a connection release indication.

Alternatively or additionally, a base station may transmit an MIB to a legacy WTRU upon receiving a connection release indication. The MIB may include an indication of the base station's energy-saving mode as described previously. The legacy WTRU that may not support energy saving cells may not be able to camp on the cell in such an energy saving mode indicated by the base station, and so may (perhaps in some embodiments according to the WTRU's normal operation) search for a different base station. Alternatively, a legacy WTRU may not know how to interpret the information in the MIB which indicates the base station's energy saving mode and may ignore it or declare it invalid.

Embodiments contemplate that a NodeB, upon activating an energy-saving mode, may change the Common Pilot Channel (CPICH) scrambling code it may be using for its cell, thereby effectively changing the Cell Identity (Cell ID). The scrambling code may be changed in such a way that WTRUs may be able to determine that the base station is entering an energy-saving mode. A legacy WTRU may not understand that the base station is entering an energy-saving mode. Embodiments contemplate that a legacy WTRU may reselect a new cell that may not be configured in an energy saving mode.

A base station may also use a multi-phase approach to enter an energy-saving mode. For example, in a first phase, before the energy-saving mode is activated, the base station may change its cell offset values (for example, Qoffset1 and Qoffset2) to a value such that legacy WTRUs may naturally reselect to a different cell. In some embodiments, the base station may then pause for a time. In a second phase, the base station may then inform one or more WTRUs that it is entering an energy-saving mode, by using paging or any of the other methods described previously. Again in some embodiments, the base station may then pause for a time. In a third and perhaps final phase, the base station may activate an energy-saving mode. After entering an energy-saving mode, a NodeB may broadcast a reduced set of SIBs that allow for initial access by a WTRU capable of operating in the energy-saving mode. Also, the reduced set of SIBs may allow initial access by a legacy WTRU, which may be a WTRU that may not be specifically designed to operate in the energy-saving mode, but perhaps may be able to access a NodeB in an energy-saving mode.

Embodiments contemplate that a base station may exit an energy-saving mode based on one or more criteria. For example, a base station may exit an energy-saving mode based on monitored activity in the cell. As an example, a base station may measure the number of WTRU-originated and/or WTRU-terminated calls and compare it to a threshold value; if the measurement is higher than the threshold value, it may exit the energy-saving mode for the cell.

When a base station exits an energy-saving mode, it may notify WTRUs that it is exiting the energy-saving mode. The base station may do so by using messages that correspond to any of the messages described herein for the notification of entry into an energy-saving mode. For example, the base station may set an energy-saving flag in the MIB to indicate that the base station is exiting the energy-saving mode.

When the base station exits an energy-saving mode, it may send a paging message with one or more fields that indicate that the base station has exited the energy-saving mode and/or that the base station will begin to send SIBs according to normal operation. The base station may then begin to broadcast SIBs per normal operation, for example. Thus the paging message may motivate the WTRUs to monitor the MIB and the one or more SIBs. Alternatively or additionally, embodiments contemplate that if the MIBs/SIBs are changing due to the base station exiting the energy-saving mode, then the base station configuration may be changing and the paging message may cause the WTRU to read the new information so that it may continue to be configured in a compatible manner for control/communication with the base station. This may allow, for example, refreshing of normal activity parameters, such as but not limited to: periodic location area update parameters; periodic routing area update parameters; access mode parameters; and/or other parameters. Alternatively, the base station may reconfigure the cell SIBs for normal operation and let the WTRUs on the cell operate seamlessly.

Embodiments contemplate that a cell may autonomously exit energy saving mode based on detection of activity (for example, incoming calls or WTRU reselections such as location updates received or handovers) or based on a schedule supplied by a controlling Radio Network Controller (RNC) or Operation and Maintenance (OAM) system. The cell, while moving to normal active state, may send an indication to the controlling RNC using a RESOURCE STATUS INDICATION message to inform the controlling RNC of exiting an energy saving mode. The cell may use, for example, the Resource Operational State IE and the Availability Status IE with an appropriate cause IE or a newly defined cause "exit energy saving mode." Alternatively, the NodeB may use a new message over Iub interface to inform the controlling RNC of exiting an energy saving mode.

Upon reception of an exiting energy saving mode indication, the RNC may reconfigure to the normal active state specific parameters by using the existing Node B Application Part (NBAP) cell configuration messages, downloading the full cell configuration, or using a new dedicated message to revert to the normal active state configuration. Alternatively, the NodeB may store the normal active state configuration before entering energy saving mode, and may restore it upon leaving the energy saving mode.

Embodiments contemplate that upon reception of an exiting energy saving mode indication, the controlling RNC may reconfigure one or more of the neighboring nodes to normal active state operation to allow for normal cells inter operability. The RNC may use the existing NBAP cell configuration messages to restore the normal active state parameters in the one or more neighboring nodes. The RNC may also use a new flag to indicate to the one or more neighboring nodes that normal active state is invoked and that normal configuration may be sent or that the one or more neighboring nodes may restore the normal active state configuration from their own memory.

Alternatively, embodiment contemplate that the controlling RNC may decide to move a cell from energy saving mode to the normal active state dynamically, based on, for example, mobility thresholds, traffic, a specific schedule, or an OAM order. The controlling RNC may use a flag to indicate that the energy state is changing. The controlling RNC may also use a new dedicated NBAP message, followed by the cell reconfiguration procedures described above.

A WTRU may signal to a NodeB that is it is capable of supporting operation by the NodeB according to at least one energy-saving mode. A WTRU may indicate its capability using one or more fields or bit flags in one or more messages. A WTRU may indicate which types of energy-savings modes it can support. A NodeB may use this capability information to determine when and/or where to enter an energy-saving mode and/or which energy-saving mode to enter. This WTRU capability information may also be provided to an RNC, and the RNC may use the information to provide commands to one or more NodeBs as to when to enter energy-saving modes.

Embodiments contemplate that a NodeB may autonomously make a determination to enter an energy-saving mode. It may send one or more messages to the network (for example, the RNC) to indicate that it has done so. The network (RNC) may then configure one or more neighboring NodeBs to ensure proper operation of the network as described herein. Alternatively, embodiments contemplate a base station may be configured to enter an energy-saving mode when, in some embodiments perhaps only when, it receives a command to do so from its network (RNC).

Embodiments contemplate one or more energy-saving modes. For example, embodiments contemplate that a NodeB may send the MIB and SIB messages that may include cell access information, and in some embodiments may only send the MIB and SIB messages that include cell access information.

According to an exemplary first energy-saving mode, a NodeB may send MIB messages and cell access information SIB messages, and in some embodiments may only send MIB messages and cell access information SIB messages. The MIB may contain only the schedule for the cell access information elements. Cell access information elements may be found in, for example, SIBS and/or SIB5bis messages. A WTRU may interpret the reduced MIB/SIB combination set as an indication that the energy-saving mode is activated for that cell. Alternatively, the MIB may contain one or more fields indicating that the NodeB is in an energy-saving mode. The use of the label "first energy-saving mode" (and "second energy-saving mode", etc., disclosed infra) is done for the purpose of illustration and does not imply any required order, prerequisite, dependency, and/or relative level of importance or utility among the disclosed energy-saving modes.

When a NodeB sends only MIB messages and cell access information SIB messages, this may be sufficient information for other WTRUs to establish access to the NodeB. However, other information that may typically be included in the SIB messages (which are not being broadcasted) may be needed by a WTRU. To obtain this other information, the WTRU may send a Location Update message to the NodeB. The WTRU may send the Location Update message using the parameters received in the SIB5 and/or SIB5bis messages. In an instance where the WTRU is in idle mode prior to sending the Location Update message, the WTRU may first send an RRC Connection Request message to the base station. The RRC Connection Request message may indicate an establishment cause to the network. For example, the establishment cause may indicate that the WTRU needs to reselect to a cell in energy-saving state. Also by way of example, the establishment cause may indicate a "Cell Reselection Request" or "System Information Request", among others.

Embodiments contemplate that in response to the Location Update request message, the NodeB may send a Location Update Acknowledge message to the WTRU. The Location Update Acknowledge message may include the remainder of information that would typically be included in the SIB messages according to normal operation, for example. Alternatively, the Location Update Acknowledge message may indicate that the WTRU should use a default system information configuration. The default system information configuration may be pre-configured, or may be sent by the network to the WTRU via one or more other cells.

In an instance where the WTRU uses discontinuous reception (DRX) in idle mode, the WTRU may need a "CN domain-specific DRX cycle length coefficient" parameter that is broadcast in SIB1, for example. This parameter may be used to calculate the DRX cycle length. In such an instance, the base station may additionally broadcast SIB 1 in addition to SIBS and/or SIB5bis. An SIB1 message transmitted by the NodeB may include some or all of the typical SIB1 field, or may include only the "CN domain-specific DRX cycle length coefficient" field. Alternatively, a different SIB message may be used to contain the "CN domain-specific DRX cycle length coefficient" field. This different SIB message may be, for example, "SIB20," or it may be a different message.

Further, a SIB message may be used to broadcast only the information necessary to configure the RACH (Random Access Channel) and the Forward Access Channel (FACH) and to allow for a WTRU to send an RRC Connection Request message. This SIB message may be, for example, "SIB 5" and/or "SIB 6", or a different message. It may contain, for example, a "Physical Random Access Channel (PRACH) system information list" field and/or a "Secondary Common Control Physical Channel (S-CCPCH) system information" field.

According to an exemplary second energy-saving mode, a NodeB may transmit the MIB, and in some embodiments may only transmit the MIB. This may be used, for example, where a target cell may broadcast only the MIB and where access information requested for cell reselection may be broadcast to WTRUs in the source cell.

A NodeB, when in energy-saving mode, may transmit only the MIB and may use a default configuration for cell system information. In conjunction with information provided by another NodeB (which may not be in an energy-saving mode), a WTRU may reselect and access the NodeB that is in the energy-saving mode. Access information required for cell reselection may be provided to the WTRU in the source cell. This may be done according to one or any combination of the following approaches, as well as via other approaches not listed herein.

Embodiments contemplate that default cell system information may be used. When a target base station is in energy-saving mode, it may use a special configuration, in addition to dedicated cell information. The default configuration may depend on the capabilities of the NodeB, and/or may be defined according to a standard, for example.

Embodiments contemplate that the information may be pre-configured per one or more energy-saving neighboring cells. This information may include the minimum required information for cell access, or may include the entire system information.

Embodiments contemplate that a WTRU may receive a neighbor cell list which contains energy-saving mode parameters for neighboring cells. The neighbor cell list may contain information related to the energy-saving state of one or more neighboring NodeBs (if applicable), and/or may contain SIB information for the one or more neighboring NodeBs (if applicable).

Embodiment contemplate that a WTRU may receive, in one or more dedicated messages, information for energy-saving mode parameters and/or SIB information related to a neighboring NodeBs. The WTRU may send a query for this information to a NodeB and/or RNC, and this information may be received in a response message.

To obtain system information that may not be broadcast by the target NodeB and that cannot be acquired in a source cell, and/or is not in a default system information configuration, a WTRU may send a Location Update message to the NodeB and/or the RNC associated with the NodeB, by using default access parameters and/or parameters received in the source cell. Alternatively, the WTRU may send an RRC Connection Request message or other RRC message. The RRC Connection Request message may indicate an establishment cause to the network. For example, the establishment cause may indicate that the WTRU needs to reselect to a cell in an energy-saving state.

The NodeB and/or RNC may respond to the RRC Connection Request or other RRC message by sending a Location Update Acknowledge message to the WTRU. The Location Update Acknowledge message may contain information that may be required by the WTRU to access the target NodeB in an idle or connected mode, for example. In an instance where an entire system information configuration was made available to the WTRU in the previous cell and/or the new base station is not an energy-saving cell, the message may be a Location Update Acknowledge message that has contents per normal operation.

Alternatively, the NodeB and/or RNC may respond to the RRC Connection Request or other RRC message by sending the WTRU at least one paging message. The paging message may be a Paging Type 1 message carrying Broadcast Channel (BCCH) modification information. The paging message may also be a Paging Type 2 message with new information, such as a system information change indicator. The NodeB may broadcast the MIB and/or SIBs for some period of time, and then return to an energy-saving mode. SIB3, SIB5, and SIB7 may not be scheduled in the MIB that is broadcast. So that the WTRU will not determine that the NodeB is barred, or to avoid such a determination, the MIB may contain a flag indicating that the NodeB is in an energy-saving mode.

Alternatively, the NodeB and/or RNC may respond to the RRC Connection Request or other RRC message according to the following: Before the base station enters an energy-saving mode, it may send a message to its RNC to indicate that it is doing so. The RNC may then indicate to the WTRU (via one or more other base stations) which neighboring base stations are in an energy-saving mode. When a base station is leaving an energy-saving mode, it may send another message to the RNC, indicating that it is doing so. The RNC may then update data that it is storing regarding the base station's state, and may reconfigure the neighboring base station for normal operation. One or more messages may be used to indicate whether one or more neighboring base stations are in an energy-saving mode and which are not using the procedures described previously. The messages may be include, for example, one or more measurement control messages used for controlling WTRUs in cell_DCH state. Alternatively or additionally, the messages may include SIB11 and/or SIB12 messages.

Upon receiving the information that indicates which neighboring base stations are in an energy-saving mode and which are not, the WTRU may perform a cell reselection procedure to reselect to a cell that is in an energy-saving mode.

Embodiments contemplate an exemplary third energy-saving mode in which a NodeB may broadcast the Common Pilot Channel (CPICH) and/or Synchronization Channels (SCH), and in some embodiments may only broadcast the Common Pilot Channel (CPICH) and/or Synchronization Channels (SCH). In doing so, the NodeB may not transmit the MIB and SIBs as per normal operation. The NodeB specific energy saving mode configuration and neighboring nodes may be achieved using the one or more of the procedures described previously.

Embodiments contemplate that access information required for cell reselection, or at least minimum access information, may be provided to the WTRU in the source cell. This may be done according to one or any combination of the following approaches, as well as via other approaches not listed herein.

Embodiments contemplate that default cell system information may be used. The default cell system information may include a subset of channels such that a WTRU may make determinations for mobility or modulation purposes. By way of example, a default set of information may be standardized or signaled by a RRC, predetermined, or otherwise known to the WTRU and the NodeB so that the system can operate without the customary MIBs and SIBs. When a target base station is in energy-saving mode, it may use a special configuration, in addition to dedicated cell information. The default configuration may depend on the capabilities of the NodeB, and/or may be defined according to a standard, for example.

Embodiments contemplate that the information may be pre-configured per energy-saving neighboring cell. This information may include the minimum required information for cell access, or may include the entire system information.

Embodiments contemplate that a WTRU may receive a neighbor cell list which contains energy-saving mode parameters for neighboring cells. The neighbor cell list may contain information related to the energy-saving mode of one or more neighboring NodeBs (if applicable), and/or may contain SIB information for the one or more neighboring NodeBs (if applicable).

Embodiments contemplate that a WTRU may receive, in one or more dedicated messages, information for energy-saving mode parameters and/or SIB information related to one or more neighboring NodeBs. The WTRU may send a query for this information to a NodeB and/or RNC, and this information may be received in a response message.

To obtain system information that may not be broadcast by the target NodeB and that cannot be acquired in a source cell, and/or is not in a default system information configuration, a WTRU may send a Location Update message to the NodeB and/or the RNC associated with the NodeB, by using default access parameters and/or parameters received in the source cell. Alternatively, the WTRU may send an RRC Connection Request message or other RRC message. The RRC Connection Request message may indicate an establishment cause to the network. The RRC Connection Request message may indicate an establishment cause to the network, indicating that the WTRU may need to reselect to a cell in an energy-saving mode.

The NodeB and/or RNC may respond to the RRC Connection Request or other RRC message by sending a Location Update Acknowledge message to the WTRU. The Location Update Acknowledge message may contain information required by the WTRU to access the target NodeB in an idle or connected mode. In an instance where an entire system information configuration was made available to the WTRU in the previous cell and/or the new base station is not an energy-saving cell, the message may be a Location Update Acknowledge message that has contents per normal operation.

Alternatively, the NodeB and/or RNC may respond to the RRC Connection Request or other RRC message by sending the WTRU a paging message. The paging message may include a system information change indicator. The NodeB may broadcast for a time the MIB and SIBs, and then return to an energy-saving mode. In an instance where a WTRU is in a cell_FACH state, the NodeB may send a SYSTEM INFORMATION CHANGE INDICATION message to the WTRU.

Under normal operation, when a WTRU does not receive a MIB from a NodeB, the WTRU may interpret the NodeB as being barred. To prevent this from occurring, the NodeB may include in CPICH frames an indicator that indicates that that the NodeB is in an energy-saving mode. A WTRU may receive a CPICH frame that may include the indicator and process the indicator. Based on the indicator, the WTRU may determine that the NodeB is in an energy-saving mode. Additionally, because the WTRU may determine that the NodeB is in an energy-saving mode, the WTRU may make a determination to not try to read the MIB (as no MIB is being transmitted). Alternatively or additionally, the source NodeB may transmit one or more messages to the WTRU, the one or more messages including one or more fields that indicate that the target NodeB is in an energy-saving mode. Based on the one or more messages, the WTRU may determine that the target NodeB is in an energy-saving mode and know that the target NodeB is not barred.

Embodiments contemplate that, in addition to or as an alternative to the approaches described above, an exemplary fourth energy-saving mode may include that the NodeB may transmit on data channels, and in some embodiments may only transmit on data channels, and may not transmit on access-related downlink channels (such as, for example, the Acknowledge Indication Channel (AICH) and/or the BCCH). This may be achieved using any of the procedures described previously. This energy-saving mode may be referred to as a "traffic-only" energy-saving mode. The NodeB may continue to transmit only the CPICH, and/or in some embodiments the SCH, for measurement purposes. The NodeB may communicate only with WTRUs that are in connected mode. According to this energy-saving mode, a WTRU may not be able to camp on the NodeB using normal reselection methods. Alternatively or additionally, this energy-saving mode may provide signals that may be required for a WTRU to measure and report to one or more networks. Embodiments contemplate that this energy-saving mode may be enabled temporarily, perhaps for some period of time (predetermined or otherwise), to allow one or more WTRUs to perform measurements. The NodeB may leave the energy-saving mode and enter a dormant mode upon the end of the period of time or upon receipt of a message from the RNC or other controlling node to enter a dormant mode.

It should be understood that any of the embodiments described herein directed to the function or capability of the WTRU and/or a base node (or base station) may be implemented by one or more processors configured to perform the disclosed function or capability. For example, the processor 118 described with regard to FIG. 1B may be configured to perform some or all of the various WTRU functions and capabilities disclosed herein, in whole or in part. Also by way of example, a processor included in an RNC or Node-B described with regard to FIG. 2 may be configured to perform some or all of the various base node functions and capabilities disclosed herein, in whole or in part.

A WTRU may camp on a cell that is operating according to normal operation. When the WTRU moves to connected mode, the source NodeB may handover the WTRU to the cell that is operating in the traffic-only energy-saving mode.

Embodiments contemplate that traffic-only NodeBs may be advertised to WTRUs using Measurement Control messages. The Measurement Control messages may be sent to WTRUs in a DCH Connected state. Traffic-only NodeBs may be included as part of a soft handover active set. Some or all of the operations involved in normal DCH Connected State operations may be applicable to traffic-only NodeBs.

A WTRU may participate in a call and/or packet data transmission on a traffic-only NodeB. Embodiments contemplate that at the end of a call/packet data transmission, the WTRU may be handed over to a normal cell in the same network, or to a different radio access technology, based on existing procedures. Alternatively or additionally, the NodeB and/or RNC may send the WTRU a connection release message. In response to the connection release message, the WTRU may be moved to a FACH state, and may be handed over to a NodeB in a normal active state. By way of example, a FACH is the Forward Access Channel, which may be carried by the Secondary CCPCH. Also by way of example the PCH (Paging Channel), may also be carried by the Secondary CCPCH. The FACH may be used to answer the RACH (Random Access Channel) on an uplink (UL) channel.

Embodiments contemplate energy saving modes for micro-cell base stations. Although the examples provided previously are with respect to macro NodeBs, the principles described are equally applicable to Home NodeBs (HNBs) and other micro-cell base stations.

A HNB may be required to transmit the MIB and SIB3/4. A Home eNodeB (HeNB) may also be required to transmit the MIB and SIB1. These requirements are in place to address at least some issues that may arise due to the use of a PSC (at HNBs) and a PCI (at HeNBs). For example, for Primary Synchronization Code (PSC), there may be a limited number of PSC codes, which may cause issues when there are many HNBs since the number of unique codes may be limited. Similar issues may also exist for Physical Cell Identity (PCI) in LTE. RRC functions may be located in the HNB and the interface with an HNB management system (HMS) entity may control configuration. Embodiments contemplate that the controlling RNC may be the HNB.

A WTRU may receive and store system information and cell access parameters related to a HNB. The WTRU may store the parameters as part of fingerprint-type information the WTRU stores from the HNB. The WTRU may include the information in an information element that may be used when the HNB is in energy-saving mode.

In an instance where a PSC or PCI is changed or reconfigured (due to a reboot, power cycle, or other cause, for example), a WTRU may automatically reacquire additional system information blocks. Alternatively or additionally, system parameters may be maintained/stored by a HNB-GW and/or a HNB Management System (HMS). When the PSC or PCI is changed, the maintained/stored system parameters may be used for HNB configuration.

The energy consumption of an HNB as a user/watts ratio may be higher, perhaps significantly higher, than the ratio for a macro cell, due to the reduced number of users served by a femto cell (or HNB). However an HNB may be considered customer premises equipment (CPE), so the consumed energy may be billed to the customer. The following may address the HNB energy savings modes and describe a service subscription concept for a HNB owner. For purpose of efficient description, the term HNB as used herein may be understood to include a femto cell. Also, the term femto cell as used herein may be understood to include an HNB.

Embodiments contemplate a new Minimization of Drive Test (MDT) measurement type that may allow for WTRU location determination in relation to a HNB. This measurement may be set up by the macro layer network or a HNB (for example, in a campus network scenario) in the vicinity of a HNB based on the WTRU mobility history that the network may have stored. This measurement setup may be carried by a dedicated RRC Measurement Control message for UMTS or may be autonomously established by the WTRU based on information carried in MIB or other SIBs. This measurement report may be a one-time report or a periodic report, for example.

Alternatively, the WTRU may begin autonomously sending this report when approaching a HNB from a stored white list with a valid fingerprint, for example. Alternatively or additionally, the measurement report may be triggered manually by the user as a one-time report.

Embodiments contemplate that this measurement request/report message, hereinafter referred to as MDT HNB, may contain one, all, or any combination of the following parameters: Trigger type (for example, Energy saving HNB), Configuration parameters (for example, Energy Saving Mode or Active Normal State), or Measurement parameters. Measurement parameters may include, for example, HNB (CSG ID, PLMN, RAT, or Frequency), Location (GPS or other type of location information), Time Stamp (time report), Delay (time to leave or enter energy saving mode), and/or Radio Environment measurements.

Embodiments contemplate that the network may use the MDT HNB-related report to move a HNB in energy saving mode into a normal active state. The measurement report may have at least the Configuration parameter Active Normal State flag set. Additionally, this action may be based on a delay time set in the report.

Alternatively, the report may be sent with at least the configuration parameter Energy Saving Mode flag set. This may include sending the HNB with these measurements to Energy Saving Mode. This report may be triggered manually by the subscriber, for example. Upon reception of this message, the network may check the membership of the WTRU with this Closed Subscriber Group identification (CSG ID), check for any other WTRUs served by the HNB and, if all conditions for entering energy saving mode are met, reconfigure the HNB for energy saving mode. This action may be based on a delay time set in the report. For example, HNB's may have CSGs which may limit which WTRUs can use the HNB.

Upon receiving the MDT HNB report type, the network may update the energy status bits in the HMS database and core network and may perform a HNB state change according to the measurements, delay time, and Energy Saving Mode/Active Normal State flags. The network may use the HMS provisioning procedures or a new message containing the energy savings mode parameters. The HNB may enter/exit Energy Saving Mode based on the HMS orders.

Embodiments contemplate that if the MDT network node entity may be used as an end point for the MDT type of reports, a new interface between MDT node and HMS entity may be required to exchange the energy savings-related orders and HNB state synchronization. In addition, the HNB neighboring nodes may be informed of the HNB energy state, perhaps to allow for inter-operability regarding MDT HNB measurements triggers. This feature may be a network subscription service. Thus, WTRUs subscribed to this feature may be allowed to use the feature for energy savings operations for their own HNB cells.

Embodiments contemplate that the new measurement type capability may be signaled through a new capability bit or by release number of the WTRU. This capability signaling may be conditioned by service subscription. Alternatively, the network may signal this capability through a new bit in the MIB or other system information element or in a dedicated RRC message such as Measurement Control or any other RRC message, for example.

A HNB that may be capable of energy savings may signal this capability through a capability bit or through a release number during its registration procedure with the network. Upon detection of this capability, the HMS may configure the HNB for energy saving operation or may disable the feature if not supported. Alternatively, the energy savings feature, if supported, may be disabled/enabled based on a service subscription basis.

A new bit may be added in the HMS (HNB Management System) database to maintain the Energy Saving State: Energy Saving Mode /Active Normal State. This bit may be replicated in the core network for the CSG ID and cell identity and synchronized with the HMS database. This may allow the HMS to perform the energy saving mode operations based on mobility in a dynamic fashion.

In combination with one or any of the energy-saving modes and/or other features described above, different statistical techniques may be used to determine when a NodeB should enter an energy-saving mode. Operation and Maintenance (OAM) statistics, for example, may be used. OAM statistics, in some instances, may be non-dynamic and/or include semi-static decision-making techniques. OAM statistics may be long-term collected statistics. Alternatively or additionally, Transport Network Layer (TNL) statistics may be used. TNL statistics are based on transport network activity, and may include statistics and interfaces for energy savings decisions. Alternatively or additionally, Radio Network Layer (RNL) statistics may be used. RNL statistics may be based on RNC statistics. In some instances, RNL statistics may be considered a dynamic for of statistics.

Figure 10:
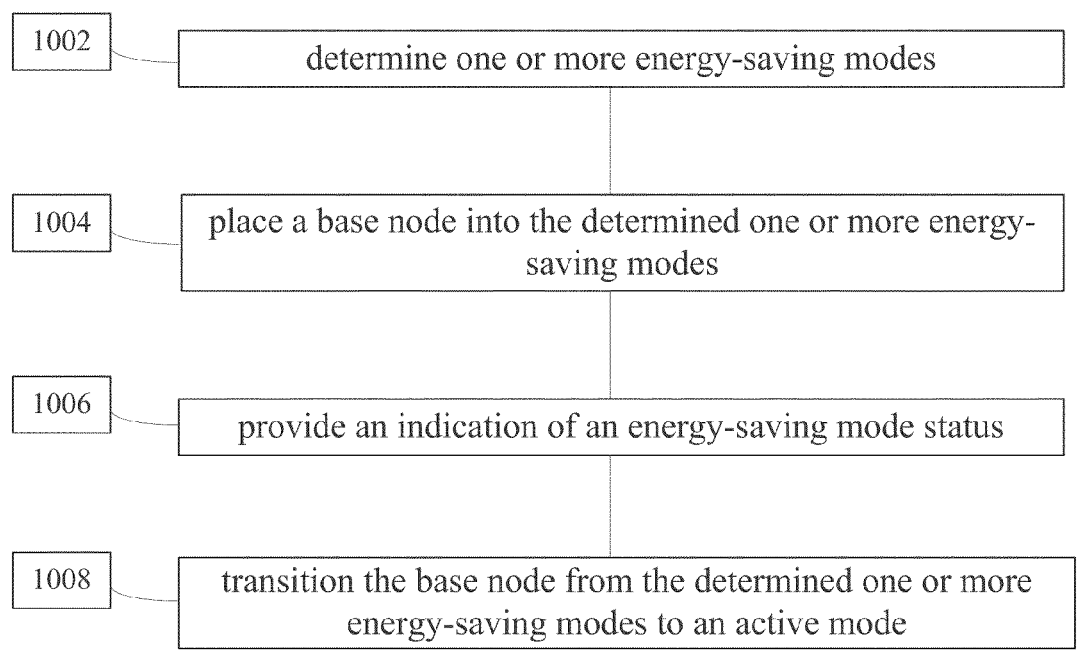
FIG. 10 shows an exemplary method of managing modes of a base station consistent with embodiments.

FIG. 10 illustrates an exemplary embodiment of a base node determining and entering one or more energy-saving modes. At 1002, a base node may determine an energy saving mode or one or more energy-saving modes. At 1004, the base node may be placed into the determined energy saving mode or one or more energy-saving modes. At 1006, the base node may provide an indication of an energy-saving mode status. At 1008, the base node may transition from the determined energy saving mode or one or more energy-saving modes to an active mode.

Embodiments contemplate that a cell may be said to be in dormant mode when it may not be transmitting any signals over the air. A cell in dormant mode may not be detected, or may not be detectable, by a WTRU. Further, a cell may be said to be in low activity mode when it is transmitting only a subset of the control channels, for instance a reference signal, common pilot channel (CPICH), a synchronization signal such as a synchronization channel (SCH) and, in some embodiments, the broadcast channel (BCH), possibly, with extended periods of discontinuous transmission (DTX).

When referred to hereafter, a target cell may be a regular NodeB, covering a macro, or more likely a femto or pico cell. The target cell may be assumed to be in an energy saving mode (either dormant or in low activity mode). When referred to herein, the (CPICH) refers to a reference channel that may be used for measurement purposes in other technologies.

Embodiments contemplate that the reference pilot channel (e.g. CPICH) of the target cell may broadcast/activate the SCH (both primary and secondary channels) that may help the WTRU perform one or more required measurements properly. Thus, when referring to CPICH herein, it may be understood that it may refer to any combination of reference signals required for measurements.

Figure 3:
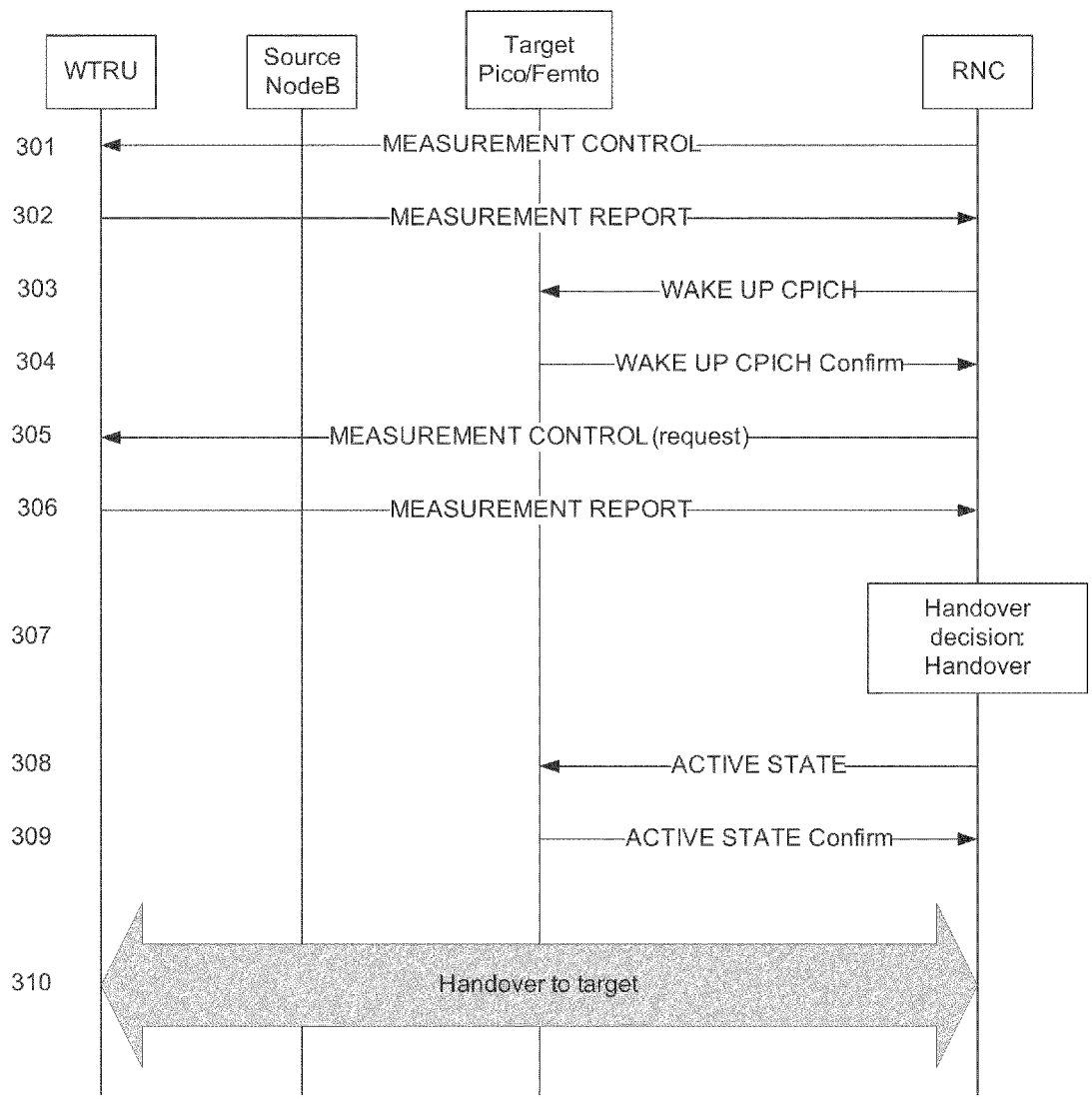
FIG. 3 shows an exemplary timing diagram consistent with embodiments where a WTRU may use location-based triggers for dormant cell activation.

Embodiments contemplate one or more protocol aspects/framework for measuring cells in dormant mode. For example, to FIG. 3 shows a timing diagram of an exemplary embodiment in which the WTRU may use location-based triggers for dormant cell activation.

Embodiments contemplate that the WTRU may be configured with measurements that may be triggered once the WTRU is in the vicinity of a target dormant cell (at 301). By way of example, being in the vicinity of a target dormant cell may mean or include the location where a WTRU would be served by the target dormant cell if the cell were not dormant or a location where the WTRU would be measuring the target dormant cell if the cell were not dormant. The WTRU may be configured to signal the network that it is in the vicinity of the dormant cell using RRC signaling once the WTRU may detect that it is in the vicinity of the dormant cell. For example, the WTRU may use a MEASUREMENT REPORT message that may carry the measurements that caused the trigger (at 302).

Embodiment described herein may be described in terms of one dormant cell, but it may be understood that the embodiments are equally applicable to one or more dormant cells. More specifically, if more than one cell may be dormant in the vicinity of the WTRU and in the scenario where the network may not know the exact location of the WTRU, more than one dormant cell may be reported and may be woken up using any of the embodiments described herein.

The network may be configured to wake up the dormant target cell. This may be accomplished, for example, by signaling a wake up signal to the dormant cell via Iur/Iub or S1/X2 interfaces in the LTE scenario. The wake up signal may indicate that the cell needs to power up the reference channel (s) and the other channels that may be necessary for the WTRU measurement. Regarding UMTS, this may correspond to the CPICH and/or, in some embodiments, the SCH. The CPICH for a WTRU to measure is shown in a WAKE UP CPICH message (at 303). In response to this wake up message, the target cell may be configured to send a confirmation message to the RNC once its CPICH has been activated (e.g., WAKE UP CPICH Confirm) (at 304). The WAKE UP CPICH and WAKE UP CPICH Confirm messages may be new messages and/or existing messages such as, for example, the CELL RECONFIGURATION MESSAGE carrying the dormant mode Indicator Information Element (IE).

Embodiments contemplate that once the target cell starts transmitting its CPICH or reference signal, the network may reconfigure the WTRU to measure this cell (at 305). This may be achieved, for example, by sending a new MEASUREMENT CONTROL message to the WTRU requesting for measuring a particular cell on a particular frequency. If necessary, the network may also provide the necessary measurement gap for inter-frequency (or inter-RAT) measurement. Optionally, the network may also provide any parameters that allow measuring that cell (e.g., extended DTX or dormant cell parameters) along with the MEASUREMENT CONTROL message. The WTRU may further be configured to send the MEASUREMENT REPORT with the requested measurement to the RNC using RRC signaling (at 306). Then, the RNC may be configured to make a handover decision (at 307).

Alternatively or additionally, the target cell upon reception of a WAKE UP CPICH order may also start broadcasting the BCH transport channel on the primary common control physical channel (P-CCPCH). This may occur, for example, in case the system frame number (SFN) is requested in the WTRU Measurement Control (at 305) of the previously described procedure or for LTE systems wherein the WTRU may need some information from the master information block/ system information block (MIB/SIB) to operate properly.

In some embodiments, only the MIB may be broadcasted and without the other SIBs, or alternatively, only the SIB1 and/or SIB3 may be broadcasted in combination with MIB. Alternatively, all SIBs may be activated or only the ones with relevant information.

If not activated during the measurement period (at 305-306), the BCH transport channel on the P-CCPCH physical channel may be activated upon activation of the target cell (moving to ACTIVE STATE).

In order to avoid other WTRUs in idle mode camping on this cell, the target cell may be barred or reserved during the cell measurement allowed period or even once fully activated. Embodiments contemplate that a fully activated cell may bar other WTRUs from camping on this cell. For example, once the connected mode WTRU moves out of the coverage of this cell the network may again deactivate this particular cell without having to move the idle mode WTRUs out of this cell. The cell barring may be implemented using existing procedures or alternatively, a new indicator on the BCH may indicate that the cell may be only active for measurements purposes and WTRUs may not camp on it.

Assuming that the network makes the decision to proceed with the handover, the network may, if necessary, indicate to the target cell that it needs to fully wake up to an active state. This may be accomplished by sending an ACTIVE STATE signal to the target cell over Iur/Iub (at 308). The target cell may then respond when it is fully activated with an ACTIVE STATE Confirm message (at 309).

Once the target cell is fully activated, the network may proceed with the handover procedure (at 310). If the cell barred during step 305-306, upon moving to ACTIVE STATE, the barring option may be turned off allowing for normal operation access.

Figure 4:
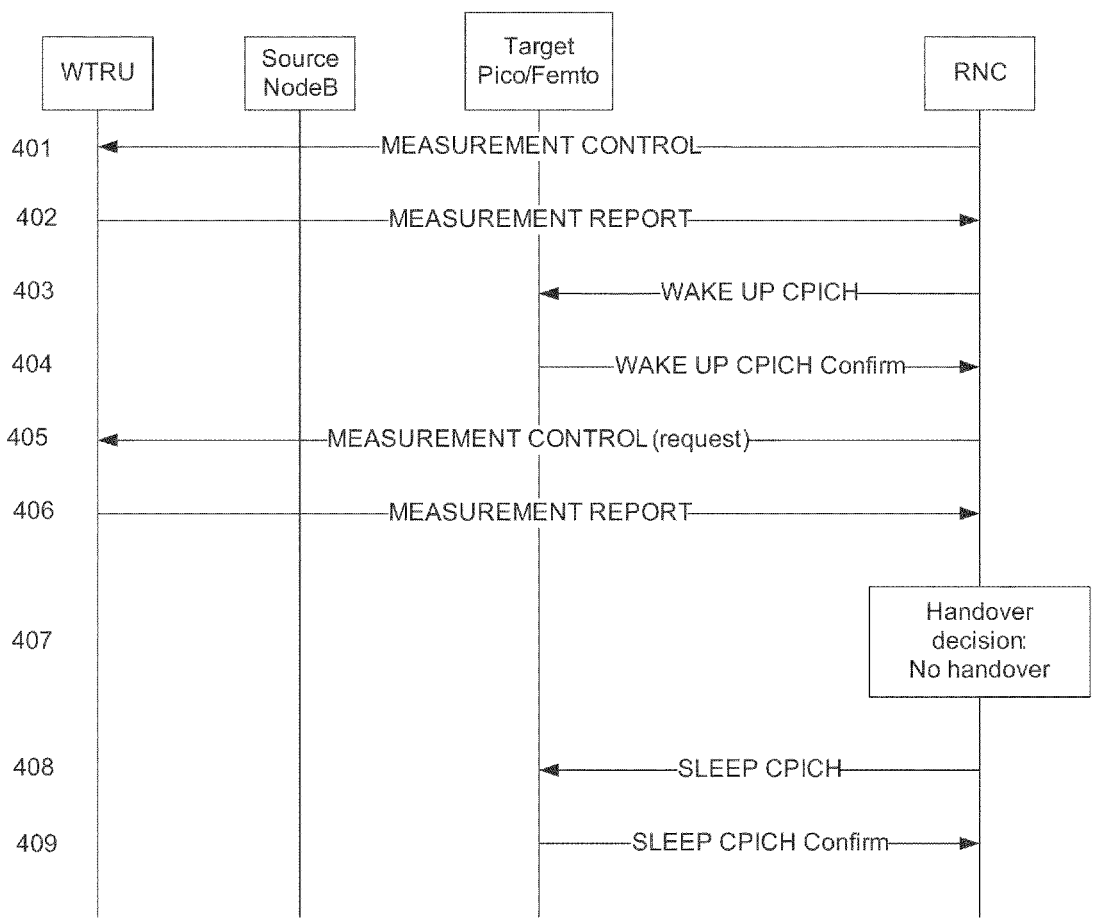
FIG. 4 shows an exemplary timing diagram consistent with embodiments where a WTRU may use location-based triggers for dormant cell activation determinations whether or not to proceed with a handover to a target cell.

FIG. 4 shows another exemplary timing diagram where the WTRU may use location-based triggers for dormant cell activation and the network may make the decision to not proceed with a handover to the target cell (at 407). In this case, the network may indicate the target cell to turn off its reference channels (CPICH, SCH and possibly BCH (P-CCPCH) if broadcasted), for example, by sending a SLEEP CPICH signal via Iur/Iub effectively sending the cell to a dormant state (at 408). The target cell may, in some embodiments, respond with a SLEEP CPICH Confirm to indicate to the network that it is now in a dormant state (at 409). As for the WAKE UP CPICH message, this SLEEP CPICH message may be a new message or may also be an existing message such as, for example, the CELL RECONFIGURATION MESSAGE IE carrying the Dormant mode Indicator IE. Elements 401-406 in FIG. 4 are similar to elements 301-306 described with reference to FIG. 3.

The elements described previously and otherwise herein may be performed in any combination or order and some elements may not be executed depending on the particular implementation of the embodiments.

Alternatively, the network may fully wake up the cell upon indication of the WTRU's vicinity instead of just wake up the CPICH. The network may configure the cell in normal operation, as described previously. The cell may be, in some embodiments, barred or reserved, and once a handover decision is performed, the network may setup the radio link resources associated with the cell and perform the handover.

Embodiments contemplate that the previously described elements may also be applicable to a scenario where the cell is in a low activity mode instead of a dormant mode. More specifically, once the WTRU triggers a report, the network may move the cell out of low activity mode and may optionally wake up the CPICH or alternatively may fully wake up the cell.

Figure 5:
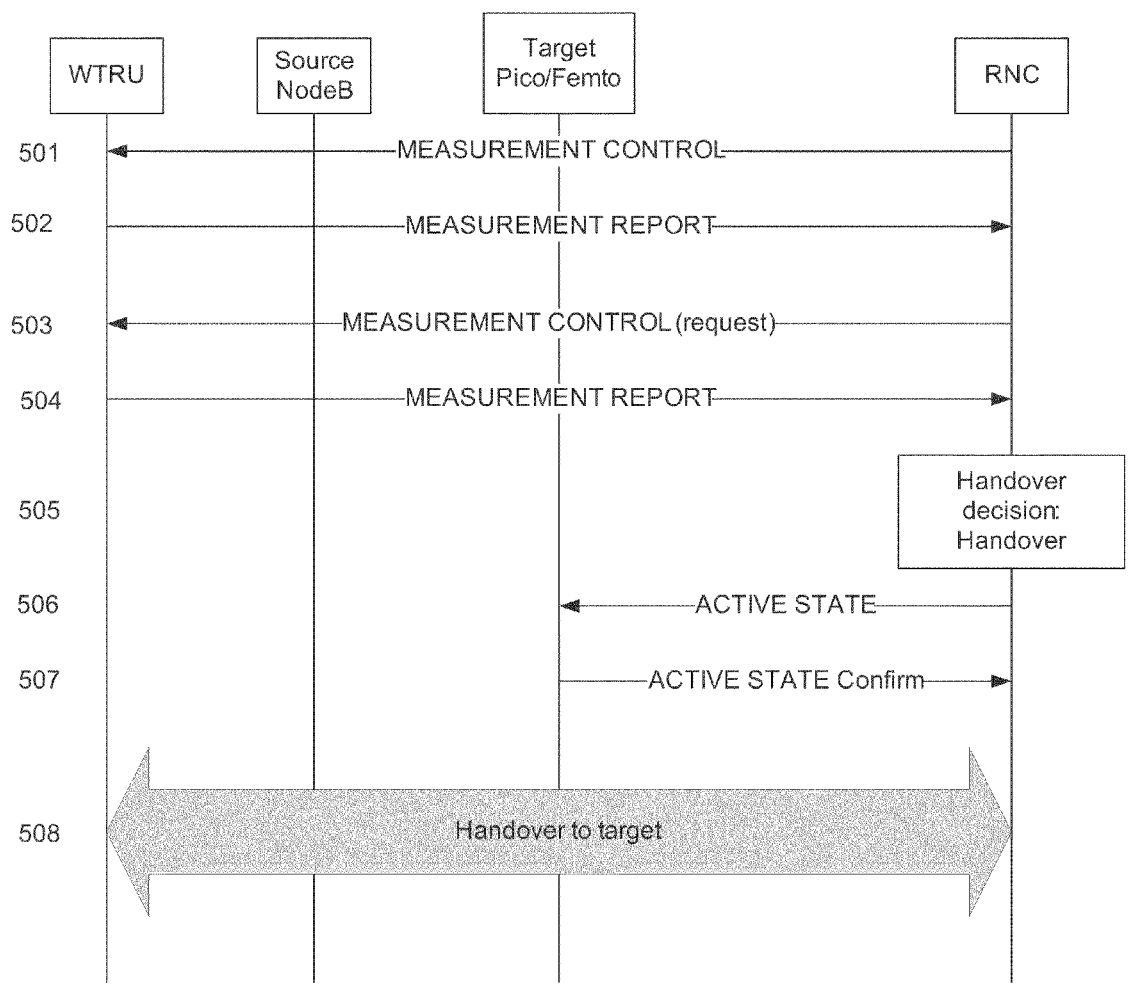
FIG. 5 shows an exemplary timing diagram consistent with embodiments where a WTRU may provide a vicinity indication and may measure a cell in low activity mode after configuration.

FIG. 5 shows a timing diagram of an exemplary embodiment where the WTRU may provide a vicinity indication and may measures a cell in low activity mode after configuration.

Embodiments contemplate that the WTRU may be configured with measurements that may be triggered once the WTRU is in the vicinity of a target cell in low activity mode (at 501). The WTRU is not configured to measure the cell in low activity mode. Once the WTRU detects that it is in the vicinity of the target cell, it indicates it to the network via RRC signaling, for example using a MEASUREMENT REPORT message optionally carrying the measurements that caused the trigger (at 502).

The network may be configured to request the WTRU to measure the target cell in low activity mode. The WTRU may receive a MEASUREMENT CONTROL message providing the measurement information (at 503). The WTRU may be configured to perform the measurement and reports the result to the network, for example via a MEASUREMENT REPORT (at 504).

The network may be configured to make the decision to perform a handover (at 505). In this case, the network signals to the target cell in low activity mode to change to normal mode of operations, for example by sending an ACTIVE STATE message via Iubdur signaling (at 506). The target cell may then respond to the RNC with an ACTIVE STATE Confirm message after it has resumed to normal mode of operations (at 507). After the target cell is in normal mode of operations, the handover procedure may be carried out (at 508).

Figure 6:
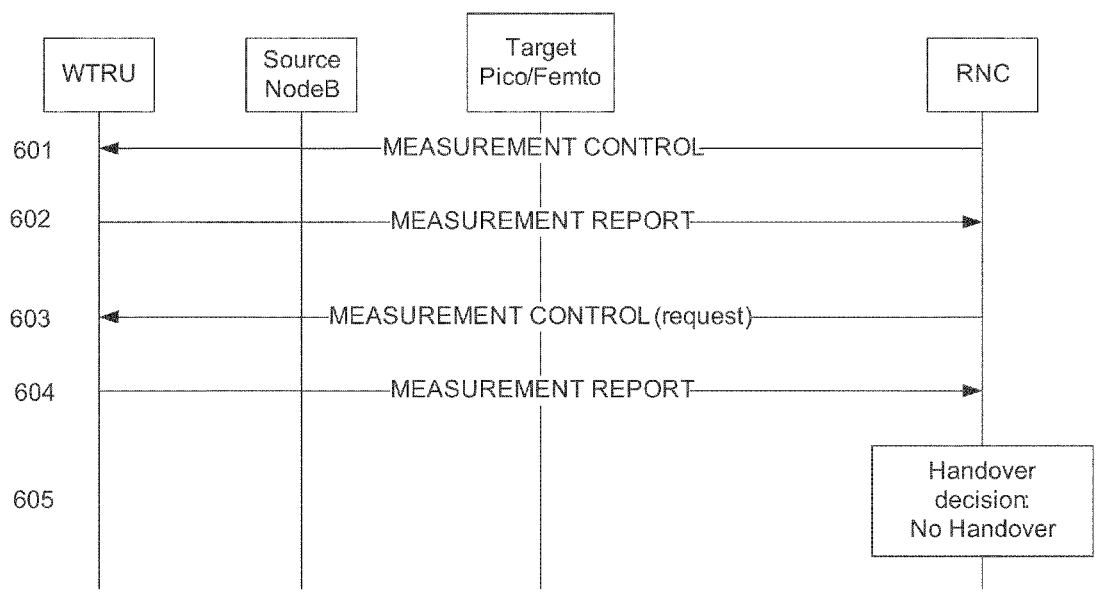
FIG. 6 shows an exemplary timing diagram consistent with embodiments where the network may decide whether to proceed with a handover to a target cell.

FIG. 6 shows an exemplary timing diagram where the network decides to not proceed with a handover to the target cell (at 605). Because the target cell may already be in low activity mode, no further actions may be required. Elements 601-604 of FIG. 6 are similar to elements 501-504 described with reference to FIG. 5.

Figure 7:
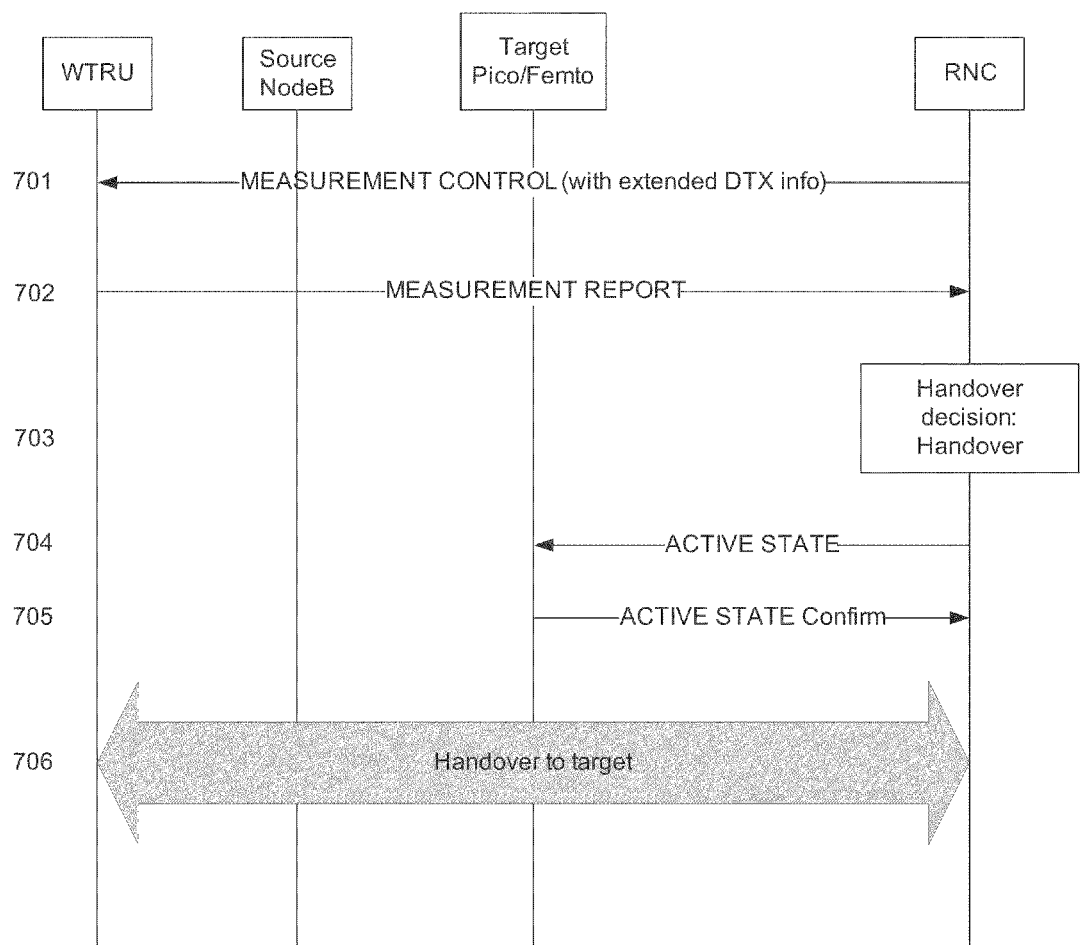
FIG. 7 shows an exemplary timing diagram consistent with embodiments where the WTRU may continuously measure a cell in low activity mode where a handover may be carried out.

Embodiments contemplate that the WTRU may be configured to measure the target cell which may be in a low activity mode. FIG. 7 shows a timing diagram of an exemplary embodiment where the WTRU may continuously measure a cell in low activity mode where a handover is carried out.

Embodiments contemplate that the WTRU may be configured to receive a MEASUREMENT CONTROL message by the network via RRC signaling (at 701). This measurement control may carry specific information regarding the target cell to measure, including potential extended DTX information. The WTRU may trigger and send a MEASUREMENT REPORT when appropriate carrying the measurement related to the target cell (at 702). The network may make a handover decision (at 703).

Alternatively or additionally, the target cell may broadcast the Broadcast Channel Primary Common Control Physical Channel (BCH (P-CCPCH)) and organize the DTX cycles based on the MIB and required SIBs. In order to avoid the WTRUs camping on the cell during the low activity state, the network may keep the cell barred or reserved and return it to normal service only when moving to ACTIVE STATE. Alternatively, the target cell may be kept barred or reserved even once fully activated.

In some embodiments, only the MIB may be broadcasted without the other SIBs, or alternatively, only the SIB1 and/or SIB3 may be broadcasted in combination with MIB. Alternatively, all SIBs may be activated or perhaps only the ones with relevant information.

The BCH (P-CCPCH) channel may be required to read the System Frame Number (SFN), which may be useful, and in some embodiments perhaps necessary, to understand the frame structure of the DL signal. The WTRU may be configured to read SFN for the target cell but, in some embodiments, may not be capable of decoding it due to the DTX cycles or P-CCPCH channel not being broadcasted. Embodiments contemplate allowing the WTRU to report the measured cell required quantity (CPICH RSCP or Ec/No) without SFN or with a dummy value, and/or setting a flag in the measurement report meaning "SFN not readable".

If the BCH (P-CCPCH) channel is not broadcasted in low activity mode, then it may be activated (e.g. at 704 described below), and the WTRU may perform a blind handover (perhaps with SFN reading at the handover time).

Embodiments contemplate that where the network may decide to proceed with the handover, the RNC may signal the target cell to go into a full active state for example by sending a ACTIVE STATE message via Iub/Iur (at 704). Alternatively or additionally, the target cell may transmit a confirmation message back to the RNC when the full active state has been reached, for example by sending an ACTIVE STATE Confirm message (at 705). Once the target cell may be fully activated, the network may proceed with the handover procedure (at 706).

Figure 8:
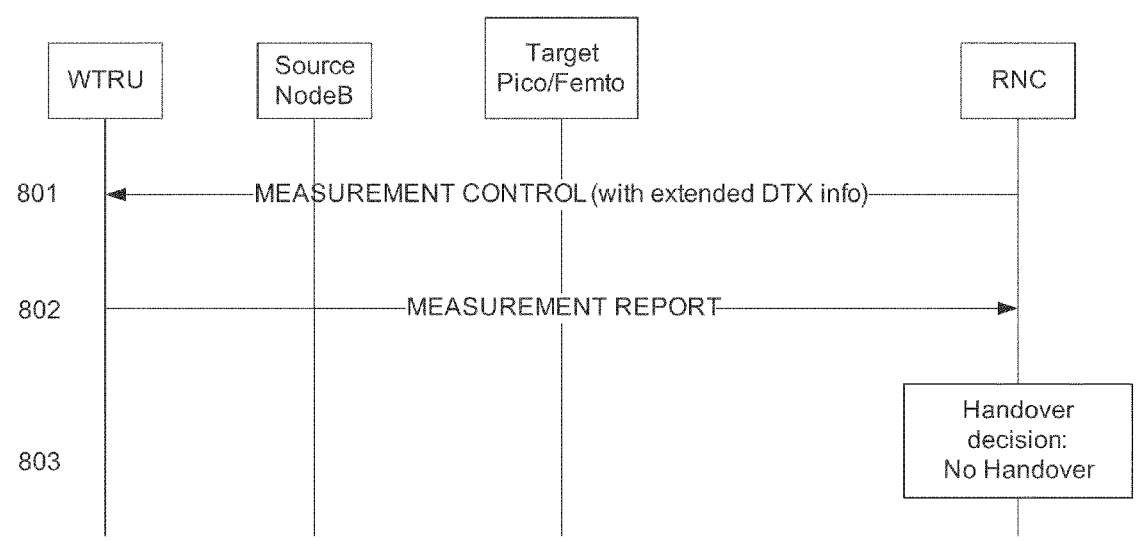
FIG. 8 shows an exemplary timing diagram consistent with embodiments where the WTRU may continuously measure a cell in low activity mode where there may be no handover.

FIG. 8 shows an exemplary timing diagram where the WTRU may continuously measure a cell in low activity mode where there is no handover (at 803). Because the target cell is already in low activity mode, no further actions are required. Elements 801 and 802 in FIG. 8 are similar to elements 701 and 702 described with regard to FIG. 7.

Embodiments contemplate that the WTRU location information used to determining cell vicinity may be useful elements to the successful application of the embodiments described herein. Embodiments contemplate methods for obtaining location information using one or more WTRU measurements.

Embodiments contemplate a number of measurements that may be performed by the WTRU to assist in acquiring the location information at one or more different levels of estimation precision. The measurements may range from radio environment measurements to dedicated position measurements. More specifically, the measurements may include: receive power of downlink pilot tone (the downlink pilot is carried on CPICH channel for WCDMA and carried on common reference signal (CRS) for LTE); signal quality parameters, such as Signal to Interference Ratio (SIR) or Energy per Chip/Noise (Ec/No, which may be a measure of the signal to noise ratio of the received signal) of a common channel; channel condition parameters such path loss calculated by power attenuation between the transmitted and received signals; and location information obtained by the IPDL measurement procedures, which is a location service achieved by time difference measurement from Idle Period in Down Link (IPDL).

Based on one or more of the previously described measurements performed with respect to multiple non-collocated neighbor NodeBs, the WTRU, or RNC, may have the capability of providing appropriate estimation of WTRU locations, for example, pattern matching technologies.

Embodiments contemplate that the WTRU may be equipped with a globe positioning system (GPS), and as such, accurate position information may be available from the WTRU. However, the GPS negatively may impact the power consumption impact of a WTRU battery. As a result, embodiments contemplate that frequent GPS measurement may be avoided if it is possible for the purpose of saving batter power.

Embodiments contemplate that one or more types of measurements, such as GPS measurements in the WTRU, may be triggered by the network. The network may determine that a WTRU is in a geographical area where energy savings mechanisms may be taking place. For example, cells in the area may be dormant or in low activity state. Alternatively, this may be determined autonomously by the WTRU.

The WTRU may also store the fingerprint information that maps the measured radio environment parameters to the WTRU's geographic position relative to the NodeBs from which the measurement is performed. For example, this fingerprint map may be obtained through historical information recorded by the WTRU and/or may be preconfigured downlink transmission from the network. Using this fingerprint map, it may also possible for the WTRU to know the distribution of the remote access points.

Embodiments contemplate that a Minimization of Driving Test (MDT) feature may provide the WTRU the capability of logging and transmitting to the network important measurement information, for example in an effort to reduce the deployment and operation cost for the cellular operators. As the specified measurement parameters in this feature may already include the required location information, this feature may be a convenient way to achieve power savings. WTRU measurement and reporting methods may be based on the WTRU measurement parameters described previously.

Additionally, the WTRU may also use the following criteria and triggers individually or in any combination to trigger the report. The criteria include the WTRU in connected mode and the load in the WTRU may be above a threshold, perhaps for a defined period of time. The threshold and/or time may be explicitly configured by the network or predefined in the WTRU. The threshold and/or time may be configured when the event, measurement type, and/or capability is configured as described above, or when one of the thresholds from other measurement types, for example, traffic volume measurement (TVM)) may be used. Also, triggering a report may be through a predetermined service or application configured in the WTRU and whether the WTRU may be in a specific mobility state such as a high mobility state, for example.

Alternatively, the WTRU may send the vicinity report additional times based upon a network signal, WTRU standard, or an autonomously determined timer expiration. This may be based on determining that the WTRU is in the same location and there was no reaction at the first report from the network side. In some embodiments, the number of the vicinity reports may be limited by the network to a signaled value or determined by a standard value. This may be done, for example, in order to limit the WTRU attempts and reduce the network signaling load.

Embodiments contemplate that if the WTRU sends the vicinity report based on the previously discussed triggers and/or a combination of triggers, the WTRU may send a new report informing the network that the WTRU may be moving away from the current vicinity area. This report may be based on one or any combination of the following triggers. The triggers may be based on detecting positioning methods indicating the WTRU may be leaving the previously signaled vicinity area. They may include a network configured location algorithm that may be combined with a time to trigger timer and/or based on a WTRU location approximation algorithm that may be combined with a time to trigger timer. The triggers may include detecting a high mobility state for a defined period of time that may be signaled by the network and/or the WTRU autonomously. The triggers may also include the measured dormant cell falling below a threshold for a defined period of time, for example.

The status of a handover command may be network signaled or WTRU determined upon expiration of a timer which was started after sending the vicinity report. This may be combined optionally with a counter for maximum number of reports that the WTRU may be allowed to send. The maximum number of reports may be network signaled, standard fixed value, or a WTRU autonomously determined value.

Embodiments contemplate that in order to provide vicinity information, the network may configure the WTRU with one or more new measurement events. Such events, which may be referred to as VICINITY Event, may include a combination of one or more criteria that either individually met and/or once all are met may trigger the event.

Alternatively, an existing measurement type or event may be used and extended to include criteria for reporting such information. Alternatively, a new measurement type may be introduced. The WTRU may be configured with new measurement types, existing measurement types, new events, and/or existing events that may enable the search capabilities to allow the WTRU to report its vicinity.

Alternatively, an explicit message from the network may be used to enable/disable this search capability in the WTRU. In some embodiments, if the event or mechanism is not configured by the network, the WTRU may disable this functionality.

Embodiments contemplate one or more potential measurement configurations. In a potential measurement configuration, one set of criteria may include the measured path loss from one or more cells being within a configured range. For example, the network may configure the WTRU with one or more criteria each referring to a specific cell and a measurement quantity and reporting range. Measurement quantity may be comprised of path loss, Common Pilot Channel Received Signal Code Power (CPICH RSCP), CPICH Ec/No, or any other measurement. Table 1 shows an example where the WTRU may be configured with three different measurements. Once the WTRU determines that the measured quantities are within their respective configured range, a MEASUREMENT REPORT with event VICINITY may be triggered by the WTRU.

Additionally, other possible configurations may also include the primary synchronization code (PSC) or physical cell identity (PCI) associated to a cell. Alternatively, only one threshold may be provided for a number of PSCs or PCI. Once the WTRU determines that the quality of the requested cells, for example one or more, may be above a threshold, the WTRU may trigger one or more reports.

Table 1 may be used for example purposes. The configuration provided to the WTRU may include one or more cells with one or more thresholds that may not necessarily have a one to one mapping. In some embodiments, all of these conditions may need to persist for a time to trigger or other defined timer prior to triggering the report.

TABLE 1

| Criterion ID | Target cell information | Measured quantity | Min range value | Max range value |
|---|---|---|---|---|
| 1 | Cell Info 1 | Path Loss | X1 dB | Y1 dB |
| 2 | Cell Info 2 | CPICH RSCP | X2 dB | Y2 dB |
| 3 | Cell Info 3 | Path Loss | X3 dB | Y3 dB |

Alternatively or additionally, the network may also provide location-based triggers when the WTRU or network may support positioning. In such cases, the network may configure the WTRU with a location position (e.g.: in actual coordinates) information and a range (e.g., radius in meters). A measurement report may be triggered at the WTRU when the WTRU detects that its location is within the configured range. Table 2 illustrates an example where the WTRU may be configured to trigger a measurement report when it is within X meters of Position1.

TABLE 2

| Criterion ID | Target position | Range (radius in m) |
|---|---|---|
| 4 | Position1 | X |

Embodiments contemplate that assisted positioning mechanisms other than GPS may used such as Observed Time Difference Of Arrival (OTDOA), in which case the network may configure the WTRU appropriately, perhaps with the inclusion of Idle Periods in Downlink (IPDL) configuration. Embodiments also contemplate position and CPICH-based measurements may also be combined in order to provide an extended set of criteria. For example, Criterion 1-4 of Tables 1 and/or 2 may be combined and when all of these are met, a single MEASUREMENT REPORT may be sent to the network. The MEASUREMENT REPORT may contain the measured quantity and/or positioning measured results from all configured criterion, in addition to the cause, e.g. VICINITY EVENT. Alternatively, this may be autonomously determined by the WTRU based on previously measured and connected cells. The network may configure the WTRU to start measurements and determination on its side. For example, based on fingerprint information, measurements of the neighboring cells or other location services such as GPS, the WTRU may determine to be in the vicinity of a previously connected cell and the WTRU may trigger a report.

Embodiments contemplate that the report may indicate that the WTRU triggers may be based on any of the triggers discussed previously. The WTRU may indicate the cell identity or global cell identity of the cell it was previously connected to but may be no longer available in the current location. Optionally, the WTRU may report the cell identity of more than one cell.

Additionally, the WTRU may also indicate the frequency and potentially the radio access technology (RAT) of this cell. This level of specific information may help the network determine exactly which cell the WTRU may potentially connect to if it was power-on. Based on the cell identity, or cell identities, the network may determine exactly which cell to power on using any of the solutions described above. In some embodiments, any of these reports may be triggered using any radio resource control (RRC) message or a measurement report. Alternatively, the WTRU may report this capability to the network, upon initial RRC setup procedures, such RRC Connection Setup Complete, RRC Connection Request, and/or using the WTRU radio access capability.

Embodiments contemplate that the network may issue an initial measurement configuration message to the WTRU. During the period over which the WTRU may be performing measurements, the WTRU may be configured to send a request for network services, which may be needed to accomplish certain types of measurements, to the RNC. For example, such services may include but are not limited to: IPDL support from network and/or compressed mode support from network.

Figure 9:
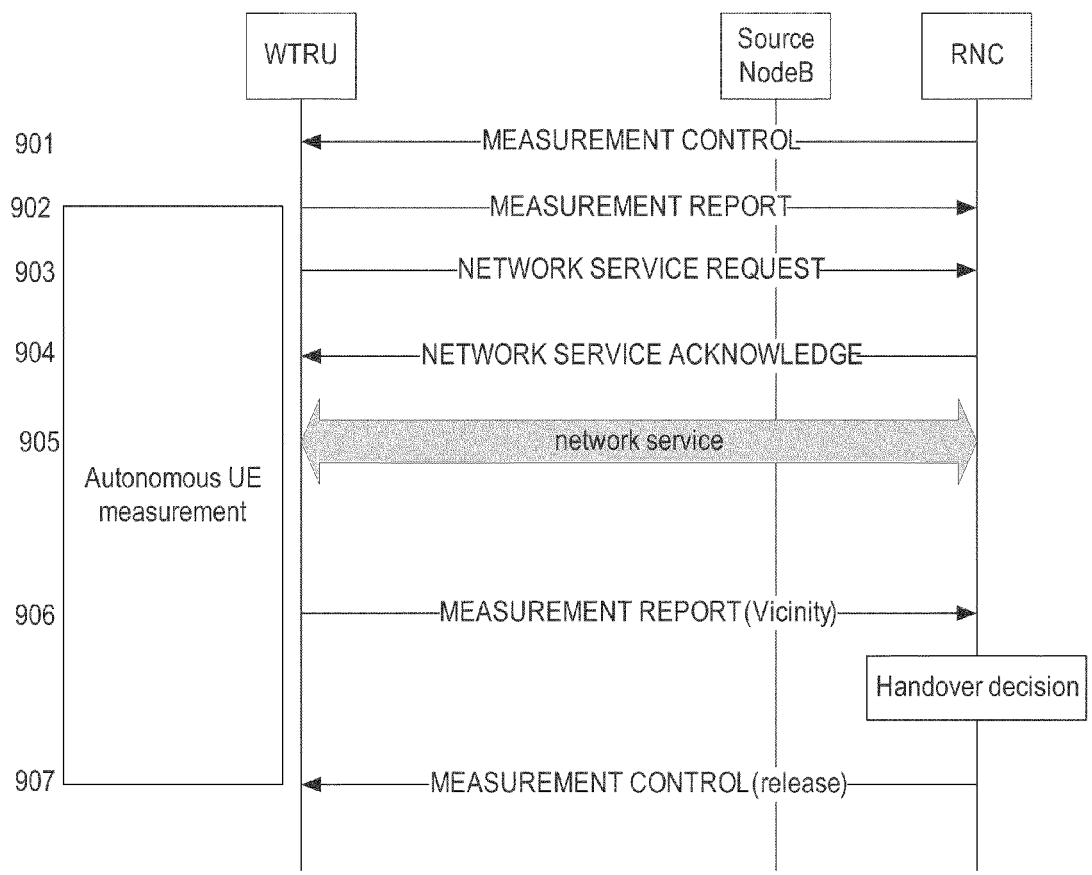
FIG. 9 shows a WTRU exemplary autonomous measurement and report method consistent with embodiments.

FIG. 9 shows an example of a WTRU autonomous measurement and report method. At 901, the WTRU may be configured to receive a measurement configuration from the RNC (via RRC signaling for example). At 902, the WTRU may be configured to perform the measurement configuration. At 903, the WTRU may determine that it needs a network service for carrying a specific measurement and the WTRU sends a (new) NETWORK SERVICE REQUEST message with the type of service specified as parameter (e.g., IPDL, Compressed mode, etc.). At 904, the WTRU may be configured to receive a NETWORK SERVICE ACKNOWLEDGE message potentially carrying additional parameter information (e.g., IPDL, Compressed mode parameters). At 905, the request network service may remain ongoing. At 906, the WTRU may be configured to perform measurements and, when vicinity criteria may be met, report to the RNC that it is within the vicinity of a remote access point. For example, the WTRU may transmit a MEASUREMENT REPORT or a new message (e.g., VICINITY REPORT). At 907, the RNC may be configured to instruct the WTRU to stop the measurement via MEASUREMENT CONTROL message or upon the HANDOVER decision made by the RNC.

Embodiments contemplate one or more methods by which a target cell may be controlled for measurement in a low activity state. For example, embodiments contemplate that, the controlling RNC (CRNC) may be informed by the way of a measurement report or a new message over the Iur interface from the (DRNC) that may control the source cell, about the vicinity of a WTRU to the femto cell, and the femto cell may be marked as being in dormant mode. The Iur may be the link between the network entities of the RNC (Radio Network Controller) and DRNC (Drift Radio Network Controller), for example. When this occurs, the CRNC may perform the following in any combination actions or in order to allow the WTRU to measure the femto/pico cell.

If the WTRU may be on an intra frequency and the femto cell may be an intra frequency cell, the CRNC may send a WAKE UP CPICH message to the dormant cell. The WAKE UP CPICH may contain a period of time if the CPICH, and potentially the SCH and/or Broadcast Channel Primary Common Control Physical Channel (BCH (P-CCPCH)) channels, may be broadcast by the femto cell for a limited period of time, for example. Embodiments also contemplate that if the femto cell is an CSG (Closed Subscriber Group) HNB, then the CRNC may, and in some embodiments perhaps must, inform the core network that the HNB cell may, and in some embodiments perhaps must, be put back in service. Due to what may be the particular architecture of the HNB's connection to the core network, a specific WAKE UP message from the HNB's core netwrok controlling node may be sent to the HNB_GW (HNB gateway). The gateway may then convey this WAKE UP message to the appropriate HNB that the gateway controls. Embodiments contemplate that a communication tunnel may, and in some embodiments must, be created between the CRNC and the HNB during this operation. Alternatively or additionally, a communication tunnel may exist temporarily or permanently under the form of an Iur type interface since the HNB may be partly an RNC as well. This message may, and in some embodiments must, be acknowledged and the acknowledge message may, and in some embodiments must, be conveyed to the CRNC that initiated the WAKE UP. This message may contain some or all of the parameters specified in the message for the dormant cell.

Embodiments contemplate that for a time limited wake up, the control channels (MIB and SIB3 at least for CSG ID identification) may, and in some embodiments must, be transmitted for a period of time, for example approximately several seconds, in order to allow the WTRU to acquire the MIB and the CSG ID).

Embodiments contemplate that WRTU may not be a member of the CSG HNB cell. If the WRTU is not a member of the CSG HNB cell, the CRNC may send a message to the HNB that may allow the HNB to go back to sleep/dormant mode at the end of the procedure. Alternatively, if the WRTU is a CSG member of the HNB, the CRNC may start the inbound mobility procedure in order to handover the WRTU to the HNB. If the WTRU is a member of the CSG HNB, the HNB may start a timer and if it does not receive the dormant/sleep message order before the timer expiration, it may return to normal operation as an inbound handover procedure may be ongoing. Alternatively, the CSG HNB may return to normal operation upon handover confirmation, perhaps when the WRTU may already be in connected mode and served by the CSG HNB.

Upon reception of the WAKE UP CPICH message, the dormant femto cell may turn ON its transceiver and may start broadcasting the CPICH, and in some embodiments, the SCH and/or BCH (P-CCPCH) channels. If the limited period of time is indicated, then after expiration the femto cell may turn OFF the CPICH, and in some embodiments the SCH and/or BCH (P-CCPCH) channels, and may turn off its transceiver as per dormant mode requirements. Upon returning to dormant mode, the femto cell may send an indication to the CRNC informing it about the transition, perhaps over the communication tunnel opened at the initiative of the CRNC, for example.

If the femto cell receives another WAKE UP CPICH message from the CRNC while executing the first CPICH WAKE UP order, the femto cell may extend the CPICH, and in some embodiments, the SCH and/or BCH (P-CCPCH) channels, broadcast with the indicated time period, or indefinitely if the period of time is not indicated.

Alternatively, if the period of time element is not present in the WAKE UP CPICH message, the femto cell may turn ON its CPICH, and in some embodiments the SCH and/or BCH (P-CCPCH) channels, and may keep the CIPCH ON until a new entry into dormant mode order may be received from the CRNC.

Alternatively, the limited period of time for CPICH, and in some embodiments the SCH and/or BCH (P-CCPCH) channels broadcast, may start after a time delay that may be calculated by the CRNC based on initial vicinity measurements that may be provided by the WTRU, for example. If the CPICH, and in some embodiments the SCH and/or BCH (P-CCPCH) channels, may broadcast for a limited time, the CRNC may send a measurement control to the WTRU containing at least one of the PSC to measure, the period of time for CPICH broadcast (if is limited), and the delay offset if there is a time delay.

Embodiments contemplate that the CPICH, and in some embodiments the SCH and/or BCH (P-CCPCH) channels, may broadcast a period of time which may be computed based on (but not limited to) the period measurements interval, time to trigger for intra frequency events, and/or location measurements as described herein.

Alternatively, the CRNC may not use a limited period of time for CPICH broadcast, and in some embodiments the SCH and/or BCH (P-CCPCH) channels, and once started may keep it ON until the WTRU may send measurement reports. Upon received measurement reports and/or events from WTRU, the CRNC may decide to turn on in active mode the femto cell and perform a handover or to return it to dormant mode.

If the femto cell is operating on inter frequency, the CRNC may adapt the CPICH, and in some embodiments the SCH and/or BCH (P-CCPCH) channels, broadcast period to the inter frequency reporting interval, and may provide the WTRU with at least one of a measurement gaps configuration, the CPICH broadcast activation time, the gaps activation time or time offset, and/or the CPICH broadcast limited time if the cell is operating in this mode (inter frequency), for example. The CRNC may use a Measurement Control RRC message with one or more new IE to send the previously described parameters or a new dedicated RRC message.

Embodiments contemplate that in the case of a limited time broadcast of the CPICH, and in some embodiments the SCH and possibly BCH (P-CCPCH) channels, the target cell may be barred for service in order to avoid other WTRUs accidentally camping on the target cell. In such an instance, the target cell may return to normal service (e.g., not be barred) upon full activation.

Embodiments contemplate methods that may allow a NodeB to go autonomously in dormant mode based on a set a measurements and triggers. For example, the femto cell may receive from the CRNC a dormant mode time to trigger parameter. This may occur in case of inactivity as one of the femto cell configuration parameters as a new IE, as well as the low activity detection parameters to supervise that may or perhaps will serve as a trigger. For example, if the femto cell is configured as described with criteria to trigger it to go into dormant mode, this criteria may be provided as a new IE (information element) in the femto cell configuration parameters. If the inactivity criteria described/defined by the IE or the femto cell configuration is met, then the cell may autonomously become dormant.

Upon detection of a low activity, meaning no WTRU context for the time to trigger interval, or very few WTRU contexts registered with the femto cell with no connected mode activity for a time to trigger interval, the femto cell may send a message over the NBAP interface informing the CRNC of its intention to go in dormant mode. Alternatively, low activity when no WTRUs are registered with the femto cell may be triggered by the lack of access request for a defined time to trigger interval. Also alternatively, the femto cell may receive a defined time schedule for its CRNC for active state/dormant mode. In such embodiments, the femto cell may follow the schedule supplied by its CRNC and go into dormant mode without considering other low activity triggers, for example.

Alternatively, in some embodiments, the femto cell may apply the previously described self-decision algorithm for going in dormant mode only in the periods scheduled by CRNC. The CRNC may confirm the femto cell with a cell reconfiguration message with the dormant mode indicator set to enter dormant mode, or alternatively, just mark the cell as in dormant mode and start a supervision algorithm described in the above sections.

Embodiments contemplate methods that may allow a NodeB to autonomously exit the dormant mode based at least on a set of measurements and triggers. For example, embodiments contemplate that the CRNC may include in the cell configuration parameters a new IE for the dormant mode schedule. In particular, defined time intervals may be specified for the dormant mode and active state in which the femto cell may follow. Based on the previously described schedule, the femto cell may decide to wake up and stay active based on the schedule, which in some embodiments may be a strict schedule.

Alternatively, the CRNC may provide the femto cell with a more complex schedule, where the dormant mode may be conditioned by activity parameters and/or the dormant mode may be a DTX cycle or a dormant mode with short wake up periods, for example. The CRNC may specify a periodic wake up schedule while the femto cell is dormant. This wake up schedule may include the full active state and the criteria to go back to sleep may be any or a combination of the methods described herein based on the strict schedule or a low activity detection, for example.

Alternatively, in some embodiments, the CRNC may wake up the femto cell only with CPICH in DTX mode while in dormant mode based on a strict schedule that can be used to synchronize measurements for the WTRUs in vicinity as described previously.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A base node, the base node being in communication with a wireless network, the base node comprising:
 a processor, the processor configured to:
  provide a first indication to a cell in a dormant mode, the first indication directing the cell to exit the dormant mode;
  receive a second indication that the cell has exited the dormant mode;
  provide a third indication to a wireless transmit/receive unit (WTRU) to generate at least one report, the at least one report including measurement results for the cell, the measurement results for the cell related to a location of the WTRU relative to the cell;

receive the at least one report from the WTRU;

determine a handover condition based at least in part on the at least one report; and provide a fourth indication to the cell based at least in part on the handover condition, the fourth indication causing the cell to enter an active mode.

2. The base node of claim 1, wherein the first indication to the cell includes a WAKE-UP Common Pilot Channel (CPICH) message, the WAKE-UP CPICH message causing the cell to transmit at least one of the CPICH or a Broadcast Channel (Primary Common Control Physical Channel) (BCH P-CCPCH).

3. The base node of claim 2, wherein the WAKE-UP CPICH message causes the cell to transmit the at least one of the CPICH or a Broadcast Channel (Primary Common Control Physical Channel) (BCH P-CCPCH) for a period of time.

\* \* \* \* \*